(12) United States Patent
Koma et al.

(10) Patent No.: US 10,450,485 B2
(45) Date of Patent: Oct. 22, 2019

(54) PRESSURE SENSITIVE ADHESIVE SHEET

(71) Applicants: LINTEC CORPORATION, Tokyo (JP); SUMITOMO SEIKA CHEMICALS CO., LTD., Hyogo (JP)

(72) Inventors: Yosuke Koma, Tokyo (JP); Yutaka Nanashima, Tokyo (JP); Yoshitomo Ono, Tokyo (JP); Kiyoshi Nishioka, Hyogo (JP); Shizuka Hachiken, Hyogo (JP)

(73) Assignees: LINTEC CORPORATION, Tokyo (JP); SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/767,932

(22) PCT Filed: Oct. 12, 2016

(86) PCT No.: PCT/JP2016/080286
§ 371 (c)(1),
(2) Date: Apr. 12, 2018

(87) PCT Pub. No.: WO2017/065188
PCT Pub. Date: Apr. 20, 2017

(65) Prior Publication Data
US 2018/0298238 A1 Oct. 18, 2018

(30) Foreign Application Priority Data
Oct. 13, 2015 (JP) .................. 2015-202388

(51) Int. Cl.
| | | |
|---|---|---|
| *C09J 7/38* | (2018.01) | |
| *C09J 133/00* | (2006.01) | |
| *C09J 133/08* | (2006.01) | |
| *C09J 133/10* | (2006.01) | |
| *C09J 7/20* | (2018.01) | |
| *C08K 5/205* | (2006.01) | |
| *C08K 5/29* | (2006.01) | |
| *C08K 5/31* | (2006.01) | |
| *C08K 5/3435* | (2006.01) | |
| *C08K 5/3462* | (2006.01) | |
| *C08K 5/3445* | (2006.01) | |
| *C09J 169/00* | (2006.01) | |

(52) U.S. Cl.
CPC .............. *C09J 7/38* (2018.01); *C08K 5/205* (2013.01); *C08K 5/29* (2013.01); *C08K 5/31* (2013.01); *C08K 5/3435* (2013.01); *C08K 5/3445* (2013.01); *C08K 5/3462* (2013.01); *C09J 7/385* (2018.01); *C09J 133/00* (2013.01); *C09J 133/08* (2013.01); *C09J 133/10* (2013.01); *C09J 169/00* (2013.01); *C09J 2201/606* (2013.01); *C09J 2203/326* (2013.01); *C09J 2205/102* (2013.01); *C09J 2205/302* (2013.01); *C09J 2433/00* (2013.01); *C09J 2469/00* (2013.01)

(58) Field of Classification Search
None
See application file for complete search history.

(56) References Cited

U.S. PATENT DOCUMENTS

| | | | | |
|---|---|---|---|---|
| 5,814,685 | A * | 9/1998 | Satake | C09D 11/326 347/100 |
| 6,037,054 | A * | 3/2000 | Shirai | C09J 123/22 428/356 |
| 6,218,006 | B1 | 4/2001 | Tokunaga et al. | |
| 7,070,051 | B2 * | 7/2006 | Kanner | A61B 17/06133 206/382 |
| 2002/0081426 | A1 | 6/2002 | Inokuchi et al. | |
| 2004/0146803 | A1 | 7/2004 | Kohl et al. | |
| 2004/0219193 | A1 * | 11/2004 | Abe | C09J 11/08 424/449 |
| 2010/0184880 | A1 * | 7/2010 | Fukui | C08G 59/686 522/20 |
| 2012/0148837 | A1 * | 6/2012 | Kashio | C09J 4/00 428/355 AC |
| 2012/0165441 | A1 | 6/2012 | Hong et al. | |
| 2012/0318854 | A1 | 12/2012 | Tsang et al. | |
| 2016/0280975 | A1 * | 9/2016 | Cho | C08J 5/18 |
| 2018/0239062 | A1 * | 8/2018 | Hattori | B32B 5/18 |

(Continued)

FOREIGN PATENT DOCUMENTS

| | | |
|---|---|---|
| JP | 08-188757 A | 7/1996 |
| JP | 09-263749 A | 10/1997 |
| JP | 2000-248240 A | 9/2000 |

(Continued)

OTHER PUBLICATIONS

Aldrich Data Shet (Year: 2019).*
International Search Report dated Nov. 15, 2016 issued in corresponding international patent application No. PCT/JP2016/080286 (and English translation).
EP Search Report dated Apr. 17, 2019 issued in corresponding EP patent application No. 16855441.8.

*Primary Examiner* — Frank D Ducheneaux
(74) *Attorney, Agent, or Firm* — Posz Law Group, PLC

(57) ABSTRACT

A pressure sensitive adhesive sheet is provided which comprises a pressure sensitive adhesive layer formed of a pressure sensitive adhesive composition. The pressure sensitive adhesive composition contains an aliphatic polycarbonate and a pressure sensitive adhesive resin other than the aliphatic polycarbonate. The pressure sensitive adhesive sheet can be reduced in the adhesive strength at desired timing by a novel mechanism of action so that the release of an adherend becomes easy. The above pressure sensitive adhesive composition preferably contains an acid/base generator that generates an acid or a base by applying energy.

19 Claims, No Drawings

(56) References Cited

U.S. PATENT DOCUMENTS

2018/0309073 A1 * 10/2018 Nakamura ................ G09F 9/30

FOREIGN PATENT DOCUMENTS

| | | | |
|---|---|---|---|
| JP | 2003-327944 A | 11/2003 | |
| JP | 2005-206674 A | 8/2005 | |
| JP | 2006-504853 A | 2/2006 | |
| JP | 2010-126587 A | 6/2010 | |
| JP | 2011-207953 A | 10/2011 | |
| JP | 2012-126781 A | 7/2012 | |
| JP | 2014-505141 A | 2/2014 | |
| JP | 2014-525835 A | 10/2014 | |
| WO | WO-2015037896 A1 * | 3/2015 | ................ C08J 5/18 |
| WO | 2016/104188 A1 | 6/2016 | |

* cited by examiner

PRESSURE SENSITIVE ADHESIVE SHEET

CROSS REFERENCE TO RELATED APPLICATIONS

This application is a U.S. national stage application of PCT/JP2016/080286 filed on Oct. 12, 2016, and is based on Japanese Patent Application No. 2015-202388 filed on Oct. 13, 2015, the contents of which are incorporated herein by reference.

TECHNICAL FIELD

The present invention relates to a pressure sensitive adhesive sheet that can be reduced in the adhesive strength at desired timing so that the release of an adherend becomes easy.

In the process of manufacturing electronic components such as semiconductor chips and laminated ceramic capacitors, pressure sensitive adhesive sheets may be used to temporarily fix working objects such as semiconductor wafers and ceramic green sheet laminates. In such pressure sensitive adhesive sheets, the adhesive strength of the pressure sensitive adhesive sheets can be reduced at desired timing by a method such as applying energy, and the release of the working objects (adherends) is thereby made easy. In the previously-described process of manufacturing electronic components, for example, adherends such as semiconductor wafers and ceramic green sheet laminates are cut into a predetermined size in a state in which they are fixed to the pressure sensitive adhesive sheets, and the adhesive strength of the pressure sensitive adhesive sheets is then reduced to release and collect the obtained cut pieces.

Proposed methods for reducing the adhesive strength of the pressure sensitive adhesive sheets include a method of forming a pressure sensitive adhesive layer using an active energy ray-curable pressure sensitive adhesive and curing the pressure sensitive adhesive layer by irradiation with active energy rays to reduce the adhesive strength (see Patent Literature 1, for example) and a method of containing thermally-expandable particles in a pressure sensitive adhesive layer and expanding the thermally-expandable particles by heating to reduce the adhesive strength of the pressure sensitive adhesive layer (see Patent Literature 2, for example).

PATENT LITERATURE

[Patent Literature 1] JP8-188757A
[Patent Literature 2] JP2000-248240A

SUMMARY OF THE INVENTION

Problems to be Solved by the Invention

An object of the present invention is to provide a pressure sensitive adhesive sheet that can be reduced in the adhesive strength at desired timing by a novel mechanism of action so that the release of an adherend becomes easy.

Means for Solving the Problems

To achieve the above object, first, the present invention provides a pressure sensitive adhesive sheet comprising a pressure sensitive adhesive layer formed of a pressure sensitive adhesive composition, the pressure sensitive adhesive composition comprising an aliphatic polycarbonate and a pressure sensitive adhesive resin other than the aliphatic polycarbonate (Invention 1).

In the above invention (Invention 1), the aliphatic polycarbonate contained in the pressure sensitive adhesive composition decomposes while generating carbon dioxide by heat. It is conceivable that the thermal decomposition of the aliphatic polycarbonate allows the generated carbon dioxide to accumulate at the interface between the pressure sensitive adhesive layer and the adherend to reduce the contact area with the adherend. When heat is applied at desired timing, therefore, the adhesive strength of the pressure sensitive adhesive layer can be reduced by a different mechanism than cohesive failure. Moreover, the pressure sensitive adhesive composition contains the pressure sensitive adhesive resin other than the above aliphatic polycarbonate thereby to allow the adhesive strength of the pressure sensitive adhesive sheet to be set at a desired value.

In the above invention (Invention 1), the aliphatic polycarbonate preferably does not have a carboxylic ester bond and a urethane bond in its main chain (Invention 2).

In the above invention (Invention 1, 2), the aliphatic polycarbonate preferably has a weight-average molecular weight of 10,000 or more and 1,000,000 or less (Invention 3), and the aliphatic polycarbonate preferably has a glass-transition temperature of −100° C. or higher and 150° C. or lower (Invention 4).

In the above invention (Invention 1 to 4), the aliphatic polycarbonate preferably has a constitutional unit represented by General Formula (1a) as below (Invention 5).

[Chemical Formula 1]

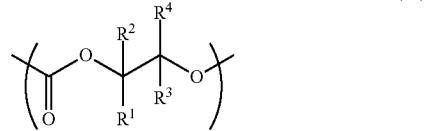

(In the formula, $R^1$, $R^2$, $R^3$, and $R^4$ each independently represent a hydrogen atom or an alkyl or alkoxy group that is unsubstituted or has a substituent. When any two or more of $R^1$, $R^2$, $R^3$, and $R^4$ are alkyl or alkoxy groups that are unsubstituted or have substituents, the two or more alkyl or alkoxy groups may be bonded to each other to form a ring.)

In the above invention (Invention 1 to 5), the pressure sensitive adhesive composition preferably contains 1 mass part or more and 100 mass parts or less of the aliphatic polycarbonate with respect to 100 mass parts of the pressure sensitive adhesive resin (Invention 6).

In the above invention (Invention 1 to 6), a polymer that constitutes the pressure sensitive adhesive resin preferably has a weight-average molecular weight of 300,000 or more and 2,000,000 or less (Invention 7), and the polymer that constitutes the pressure sensitive adhesive resin preferably has a glass-transition temperature of −70° C. or higher and 5° C. or lower (Invention 8).

In the above invention (Invention 1 to 8), the polymer that constitutes the pressure sensitive adhesive resin is preferably an acrylic-based polymer (Invention 9).

In the above invention (Invention 1 to 9), the pressure sensitive adhesive composition preferably contains an acid/base generator that generates an acid or a base by applying energy (Invention 10).

In the above invention (Invention 10), the pressure sensitive adhesive resin is preferably a curable pressure sensitive adhesive resin that is cured by applying the energy (Invention 11).

In the above invention (Invention 10, 11), means for applying the energy is preferably irradiation with active energy rays (Invention 12).

In the above invention (Invention 12), the polymer that constitutes the pressure sensitive adhesive resin is preferably an acrylic-based polymer having an active energy ray-curable group in a side chain (Invention 13).

In the above invention (Invention 10, 11), the energy is preferably thermal energy (Invention 14).

In the above invention (Invention 10 to 14), the acid/base generator preferably has a cation comprising a biguanide derivative (Invention 15).

In the above invention (Invention 10 to 15), the pressure sensitive adhesive composition preferably contains 0.5 mass parts or more and 50 mass parts or less of the acid/base generator with respect to 100 mass parts of the aliphatic polycarbonate (Invention 16).

In the above invention (Invention 1 to 16), the pressure sensitive adhesive sheet preferably comprises a base material (Invention 17), and the base material preferably has heat resistance (Invention 18).

Advantageous Effect of the Invention

The pressure sensitive adhesive sheet according to the present invention can be reduced in the adhesive strength at desired timing by a novel mechanism of action so that the release of an adherend becomes easy.

EMBODIMENTS FOR CARRYING OUT THE INVENTION

One or more embodiments of the present invention will be described hereinafter.

The pressure sensitive adhesive sheet according to the present embodiment comprises a pressure sensitive adhesive layer formed of a specific pressure sensitive adhesive composition. The pressure sensitive adhesive composition contains an aliphatic polycarbonate and a pressure sensitive adhesive resin other than the aliphatic polycarbonate and may preferably contain an acid/base generator that generates an acid or a base by applying energy.

In the present embodiment, the aliphatic polycarbonate contained in the pressure sensitive adhesive composition decomposes while generating carbon dioxide by heat. Here, it is conceivable that the thermal decomposition of the aliphatic polycarbonate allows the generated carbon dioxide to accumulate at the interface between the pressure sensitive adhesive layer and the adherend to reduce the contact area with the adherend. When heat is applied at desired timing, therefore, the adhesive strength of the pressure sensitive adhesive layer can be reduced by a different mechanism than cohesive failure. Here, when the pressure sensitive adhesive composition contains an acid/base generator, the acid or base generated by applying energy promotes the thermal decomposition of the aliphatic polycarbonate, and the reduction in the adhesive strength can therefore be more efficiently achieved.

Moreover, the pressure sensitive adhesive composition contains the pressure sensitive adhesive resin other than the above aliphatic polycarbonate thereby to allow the adhesive strength of the pressure sensitive adhesive sheet to be set at a desired value. Furthermore, in some cases such as when the pressure sensitive adhesive resin is an active energy ray-curable resin, a thermoset resin or the like and when the pressure sensitive adhesive resin contains thermally-expandable particles, the extent of reducing the adhesive strength of the pressure sensitive adhesive sheet can readily be controlled.

1. Aliphatic Polycarbonate

The pressure sensitive adhesive composition of the present embodiment contains the aliphatic polycarbonate as an essential component. The aliphatic polycarbonate decomposes while generating carbon dioxide by heat, and the adhesive strength of the pressure sensitive adhesive layer can therefore be reduced by applying heat at desired timing. A coating liquid of the pressure sensitive adhesive composition which contains the aliphatic polycarbonate can be prepared because the aliphatic polycarbonate dissolves in a solvent, unlike aromatic polycarbonate and the like, and working into a sheet-like form is thus possible.

(1-1) Structure of Aliphatic Polycarbonate

In the aliphatic polycarbonate contained in the pressure sensitive adhesive composition of the present embodiment, the main chain of the polycarbonate is composed only of a carbonate group (—O—C(=O)—O—) and aliphatic groups and has a structure in which the carbonate group connects between the divalent aliphatic groups which constitute the main chain.

The above aliphatic polycarbonate may have, but preferably may not have, a carboxylic ester bond (—C(=O)—O—) in its main chain. When the aliphatic polycarbonate has no carboxylic ester bond in the main chain, the aliphatic polycarbonate does not contain a polymer having a polycarbonate skeleton that is obtained through a reaction between carboxylic acid or its derivative and alcohol to form an ester bond in the main chain. Examples of the carboxylic acid derivatives include carboxylic acid anhydride, carboxylic acid halide and the like that can form ester bonds.

The above aliphatic polycarbonate may have, but preferably may not have, a urethane bond (—NH—C(=O)—O—) in its main chain. When the aliphatic polycarbonate has no urethane bond in the main chain, the aliphatic polycarbonate does not contain a polymer and the like having a polycarbonate skeleton that is obtained through a reaction between compounds having isocyanate groups and alcohol to form a urethane bond in the main chain.

The aliphatic polycarbonate may have or may not have any one or both of a carboxylic ester bond and a urethane bond in its side chain.

Examples of the above aliphatic polycarbonate include those having a constitutional unit represented by General Formula (1) as below.

[Chemical Formula 2]

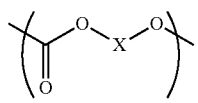

(1)

(In the formula, X represents a divalent aliphatic hydrocarbon group that is unsubstituted or has a substituent.)

In the formula, X represents a divalent aliphatic hydrocarbon group that is unsubstituted or has a substituent, and the aliphatic hydrocarbon group may be any of linear, branched, and cyclic ones and may have both a chain structure and a cyclic structure. The cyclic aliphatic hydrocarbon group may be any of monocyclic and polycyclic ones.

In X, the aliphatic hydrocarbon group "having a substituent" refers to an aliphatic hydrocarbon group in which one or more hydrogen atoms are substituted by groups (substituents) other than hydrogen atoms.

When the above aliphatic hydrocarbon group has a substituent, the substituent is not particularly limited. Examples of the substituent include a hydroxyl group (hydroxy group, —OH), carboxy group (—C(=O)—OH), halogen atom, alkoxy group, alkenyl group, alkenyloxy group, aryl group, heteroaryl group, aryloxy group, heteroaryloxy group, alkylsilyl group, and alkylsilyloxy group. Thus, provided that the groups other than the carbonate group which constitute the main chain are only aliphatic groups, the above aliphatic polycarbonate may have or may not have an aromatic group in a side chain branched from the main chain (aliphatic group), but preferably may not have an aromatic group.

Examples of the halogen atom in the above substituent include a fluorine atom, chlorine atom, bromine atom, and iodine atom.

Examples of the alkoxy group in the above substituent include those similar to the alkoxy group in $R^1$ and the like which will be described later, such as a methoxy group, ethoxy group, n-propoxy group, isopropoxy group, n-butoxy group, isobutoxy group, sec-butoxy group, tert-butoxy group, cyclopropoxy group, and cyclobutoxy group.

Examples of the alkenyl group in the above substituent include those similar to the alkenyl group in $R^1$ and the like which will be described later, such as an ethenyl group (vinyl group), 2-propenyl group (allyl group), 1-methylethenyl group, 2-methylethenyl group, 1-cyclohexenyl group, 2-cyclohexenyl group, and 3-cyclohexenyl group.

Examples of the alkenyloxy group in the above substituent include monovalent groups configured such that oxygen atoms are bonded to the previously-described alkenyl groups, such as an ethenyloxy group (vinyloxy group), 2-propenyloxy group (allyloxy group), 1-methyl ethenyloxy group, 2-methyl ethenyloxy group, 1-cyclohexenyloxy group, 2-cyclohexenyloxy group, and 3-cyclohexenyloxy group.

The aryl group in the above substituent may be any of monocyclic and polycyclic ones, and the carbon number may preferably be 6 to 13. Examples of such an aryl group include a phenyl group, 1-naphthyl group, 2-naphthyl group, o-tolyl group, m-tolyl group, p-tolyl group, and xylyl group (dimethylphenyl group) and also include those in which one or more hydrogen atoms of these aryl groups are substituted by such aryl groups or alkyl groups similar to $R^1$ and the like which will be described later. In these aryl groups having substituents, the number of carbon atoms including those of the substituents may preferably be 6 to 13.

The heteroaryl group in the above substituent may be any of monocyclic and polycyclic ones.

Examples of the heteroaryl group include a group having aromaticity, among the previously-described aryl groups, in which one or more carbon atoms that constitute the aromatic ring skeleton are substituted by hetero atoms alone or together with hydrogen atoms bonded to the carbon atoms. Examples of the heteroaryl group also include a group having aromaticity, among cyclic unsaturated aliphatic hydrocarbon groups having a carbon number of 3 or more, in which one or more carbon atoms that constitute the ring skeleton are substituted by hetero atoms alone or together with hydrogen atoms bonded to the carbon atoms. Preferred examples of such hetero atoms include an oxygen atom, nitrogen atom, sulfur atom, selenium atom, and phosphorus atom. The number of hetero atoms that constitute the aromatic ring skeleton is not particularly limited, but may preferably be 1 to 2. When the number of hetero atoms that constitute the aromatic ring skeleton is two or more, all of these plural hetero atoms may be the same or may also be different, or only some of the hetero atoms may be the same.

In the present description, for example, a group having a structure in which an aromatic hydrocarbon group and an aromatic heterocyclic group are condensed is referred to as an "aromatic heterocyclic group."

Examples of the aryloxy group in the above substituent include monovalent groups in which oxygen atoms are bonded to the previously-described aryl groups, such as a phenoxy group, 1-naphthoxy group, and 2-naphthoxy group.

Examples of the heteroaryloxy group in the above substituent include monovalent groups in which oxygen atoms are bonded to the previously-described heteroaryl groups.

The alkylsilyl group in the above substituent may be any of a monoalkylsilyl group, dialkylsilyl group, and trialkylsilyl group. In the alkylsilyl group, the alkyl group bonded to the silicon atom may be any of linear, branched, and cyclic ones and may have both a chain structure and a cyclic structure. The cyclic alkyl group may be any of monocyclic and polycyclic ones. Examples of the alkyl group bonded to the silicon atom include those similar to the alkyl group in $R^1$ and the like which will be described later, and the carbon number may preferably be 1 to 10.

In the above dialkylsilyl group and trialkylsilyl group, the plurality of alkyl groups may be the same or may also be different. That is, in the dialkylsilyl group, the two alkyl groups may be the same (examples of such a dialkylsilyl group include a dimethylsilyl group) or may also be different (examples of such a dialkylsilyl group include an ethylmethylsilyl group). In the trialkylsilyl group, all of the three alkyl groups may be the same (examples of such a trialkylsilyl group include a trimethylsilyl group) or may also be different (examples of such a trialkylsilyl group include an ethylmethyl-n-propylsilyl group), and only two may be the same (examples of such a trialkylsilyl group include an ethyldimethylsilyl group).

Examples of the alkylsilyloxy group in the above substituent include monovalent groups in which the previously-described alkylsilyl groups are bonded to oxygen atoms, such as a dimethylsilyloxy group, ethylmethylsilyloxy group, trimethylsilyloxy group, ethylmethyl-n-propylsilyloxy group, and ethyldimethylsilyloxy group.

The number of substituents of the aliphatic hydrocarbon group is not particularly limited and may be one, two or more, and all the hydrogen atoms may be substituted by substituents. In the aliphatic hydrocarbon group which is unsubstituted or has a substituent, it suffices that the total number of carbon atoms including those of the substituent is one or more, but it may preferably be two or more. From another aspect, the total number of carbon atoms including those of the above substituent may preferably be 18 or less, more preferably 14 or less, and particularly preferably 12 or less. When the total number of carbon atoms including those of the substituent is not less than the above lower limit, the aliphatic hydrocarbon group is improved in the gas generating property, and the adhesive strength of the pressure sensitive adhesive composition is sufficiently reduced after thermally decomposing the aliphatic polycarbonate. When the total number of carbon atoms including those of the above substituent is not more than the above upper limit, the adhesive strength is sufficiently high before thermally decomposing the aliphatic polycarbonate.

In the above-described aliphatic hydrocarbon group, when the number of substituents is 2 or more, these substituents may be the same or may also be different. That is, the two or more substituents may be the same or may also be different, or only some of the substituents may be the same. The bonding position of the substituent in the above aliphatic hydrocarbon group is not particularly limited, but may preferably be a position at which the terminal part of the substituent is the terminal part of a side chain, and may be located at a carbon atom that constitutes the main chain in X or may also be located at a carbon atom at the terminal part of a side chain.

The above-described aliphatic hydrocarbon group that is unsaturated or has a substituent may preferably be an alkylene group that is unsaturated or has a substituent and more preferably an ethylene group that is unsaturated or has a substituent. When the aliphatic hydrocarbon group is such an alkylene group (in particular, an ethylene group), the aliphatic polycarbonate can have a reduced glass-transition temperature (Tg) and improved properties as a pressure sensitive adhesive component, such as improved adhesive strength and workability.

The above aliphatic polycarbonate may preferably have a constitutional unit represented by General Formula (1a) as below (which may be simply referred to as a "constitutional unit (1a)," hereinafter).

[Chemical Formula 3]

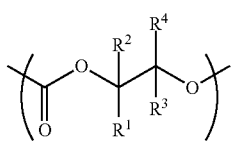

(1a)

(In the formula, $R^1$, $R^2$, $R^3$, and $R^4$ each independently represent a hydrogen atom or an alkyl or alkoxy group that is unsubstituted or has a substituent. When any two or more of $R^1$, $R^2$, $R^3$, and $R^4$ are alkyl or alkoxy groups that are unsubstituted or have substituents, these two or more alkyl or alkoxy groups may be bonded to each other to form a ring.)

In the formula, $R^1$, $R^2$, $R^3$, and $R^4$ each independently represent a hydrogen atom or an alkyl or alkoxy group that is unsubstituted or has a substituent.

The alkyl group in $R^1$ to $R^4$ may be any of linear, branched, and cyclic ones and may have both a chain structure and a cyclic structure, but may preferably be linear one. The cyclic alkyl group may be any of monocyclic and polycyclic ones.

The carbon number of the alkyl group in $R^1$ to $R^4$ may preferably be two or less and may more preferably be one.

Examples of the linear or branched alkyl group include a methyl group, ethyl group, n-propyl group, isopropyl group, n-butyl group, isobutyl group, sec-butyl group, tert-butyl group, n-pentyl group, isopentyl group, neopentyl group, tert-pentyl group, 1-methylbutyl group, n-hexyl group, 2-methylpentyl group, 3-methylpentyl group, 2,2-dimethylbutyl group, 2,3-dimethylbutyl group, n-heptyl group, 2-methylhexyl group, 3-methylhexyl group, 2,2-dimethylpentyl group, 2,3-dimethylpentyl group, 2,4-dimethylpentyl group, 3,3-dimethylpentyl group, 3-ethylpentyl group, 2,2,3-trimethylbutyl group, n-octyl group, isooctyl group, 2-ethylhexyl group, nonyl group, decyl group, undecyl group, dodecyl group, tridecyl group, tetradecyl group, pentadecyl group, and hexadecyl group.

Examples of the cyclic alkyl group include a cyclopropyl group, cyclobutyl group, cyclopentyl group, cyclohexyl group, cycloheptyl group, cyclooctyl group, cyclononyl group, cyclodecyl group, norbornyl group, isobornyl group, 1-adamantyl group, 2-adamantyl group, tricyclodecyl group, and those in which one or more hydrogen atoms of these cyclic alkyl groups are substituted by linear, branched or cyclic alkyl groups. Here, examples of the linear, branched and cyclic alkyl groups which substitute hydrogen atoms include those exemplified in the above as examples of the alkyl group in $R^1$ to $R^4$.

The carbon number of the linear alkyl group may preferably be two or less and more preferably one.

When the carbon number of the alkyl group in $R^1$ to $R^4$ has such an upper limit, the gas generating property is improved. Moreover, when the carbon number of the alkyl group in $R^1$ to $R^4$ is within such a numerical range, the above aliphatic polycarbonate having the constitutional unit (1a) can have a reduced glass-transition temperature (Tg) and improved properties as a pressure sensitive adhesive component, such as improved adhesive strength and workability.

The alkoxy group in $R^1$ to $R^4$ may be any of linear, branched, and cyclic ones and may have both a chain structure and a cyclic structure, but may preferably be linear one. The cyclic alkoxy group may be any of monocyclic and polycyclic ones.

The carbon number of the alkoxy group in $R^1$ to $R^4$ may preferably be two or less and may more preferably be one.

Examples of the linear or branched alkoxy group include monovalent groups in which oxygen atoms are bonded to the linear or branched alkyl groups in $R^1$ to $R^4$, such as a methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, tert-pentyloxy group, 1-methylbutyloxy group, n-hexyloxy group, 2-methylpentyloxy group, 3-methylpentyloxy group, 2,2-dimethylbutyloxy group, 2,3-dimethylbutyloxy group, n-heptyloxy group, 2-methylhexyloxy group, 3-methylhexyloxy group, 2,2-dimethylpentyloxy group, 2,3-dimethylpentyloxy group, 2,4-dimethylpentyloxy group, 3,3-dimethylpentyloxy group, 3-ethylpentyloxy group, 2,2,3-trimethylbutyloxy group, n-octyloxy group, isooctyloxy group, 2-ethylhexyloxy group, nonyloxy group, decyloxy group, undecyloxy group, dodecyloxy group, tridecyloxy group, tetradecyloxy group, pentadecyloxy group, and hexadecyloxy group.

Examples of the cyclic alkoxy group include monovalent groups in which oxygen atoms are bonded to the cyclic alkyl groups in $R^1$ to $R^4$, such as a cyclopropoxy group, cyclobutoxy group, cyclopentyloxy group, and cyclohexyloxy group.

The carbon number of the linear alkoxy group may preferably be two or less and more preferably one.

When the carbon number of the alkoxy group in $R^1$ to $R^4$ has such an upper limit, the gas generating property is improved. Moreover, when the carbon number of the alkoxy group in $R^1$ to $R^4$ is within such a numerical range, the above aliphatic polycarbonate having the constitutional unit (1a) can have a more reduced glass-transition temperature (Tg) and more improved properties as a pressure sensitive adhesive component, such as improved adhesive strength and workability.

When any two or more of $R^1$ to $R^4$ are alkyl or alkoxy groups that are unsubstituted or have substituents (referred to as "alkyl groups or the like," hereinafter), these two or more alkyl groups or the like may be bonded to each other to form a ring together with the carbon atoms to which these alkyl groups or the like are bonded.

In this case, the position (carbon atom) at which these alkyl groups or the like are bonded to each other is not particularly limited, but when the alkyl groups or the like having substituents form a ring, it is assumed that a carbon atom at a site other than the substituents is bonded to a carbon atom of another alkyl group.

Preferred examples of the position (carbon atom) at which two or more alkyl groups or the like are bonded to each other include terminal carbon atoms (carbon atoms of a methyl group) of these alkyl groups or the like.

When two or more alkyl groups or the like are bonded to each other to form a ring, the ring may be monocyclic or polycyclic, and the number of carbons that constitute the ring may preferably be 5 to 10.

Preferred examples of the constitutional unit (1a) in which two or more alkyl groups or the like of $R^1$ to $R^4$ form a ring include those in which any one of $R^1$ and $R^2$ and any one of $R^3$ and $R^4$ are bonded to each other to form a ring.

When the alkyl or alkoxy group in $R^1$ to $R^4$ has a substituent, examples of such a substituent include a hydroxyl group, carboxy group, halogen atom, alkoxy group, alkenyl group, alkenyloxy group, aryl group, heteroaryl group, aryloxy group, heteroaryloxy group, alkylsilyl group, and alkylsilyloxy group. These substituents are the same as those in the case in which the previously-described aliphatic hydrocarbon group has a substituent.

The number of substituents of the alkyl or alkoxy group in $R^1$ to $R^4$ is not particularly limited and may be one or may also be two or more, and all the hydrogen atoms may be substituted by substituents. In the alkyl or alkoxy group having a substituent, the number of carbon atoms including those of the substituent may preferably be within the previously-described range.

When the alkyl or alkoxy group in $R^1$ to $R^4$ has substituents and the number of substituents is two or more, these substituents may be the same or may also be different. That is, the two or more substituents may be the same or may also be different, or only some of the substituents may be the same.

The bonding position of the substituent in the alkyl or alkoxy group is not particularly limited, but in the case of the alkyl group, for example, may preferably be at its terminal part (the terminal carbon atom at the opposite side to the carbon atom of the alkyl group bonded to the ethylene group).

Examples of $R^1$ to $R^4$ having substituents, for example, as alkyl groups having substituents, include a hydroxyalkyl group having a hydroxyl group as the substituent, a carboxyalkyl group having a carboxy group as the substituent, a haloalkyl group having a halogen atom as the substituent, an alkoxyalkyl group having an alkoxy group as the substituent, an arylalkyl group (aralkyl group) having an aryl group as the substituent, a heteroarylalkyl group having a heteroaryl group as the substituent, an aryloxyalkyl group having an aryloxy group as the substituent, a heteroaryloxyalkyl group having a heteroaryloxy group as the substituent, an alkylsilylalkyl group having an alkylsilyl group as the substituent, and an alkylsilyloxyalkyl group having an alkylsilyloxy group as the substituent.

Similarly, examples of $R^1$ to $R^4$, other than alkyl groups, having substituents include those in which hydrogen atoms are substituted by substituents.

From the viewpoint of the pressure sensitive adhesive property, any one or more of $R^1$ to $R^4$ of the constitutional unit (1a) may be alkyl or alkoxy groups (alkyl groups or the like) that are unsubstituted or have substituents, but from the viewpoint of the gas generating property, the number of the alkyl groups or the like among $R^1$ to $R^4$ may preferably be two or less, more preferably one or less, and particularly preferably zero ($R^1$ to $R^4$ are all hydrogen atoms). When any one or more of $R^1$ to $R^4$ are the above alkyl groups or the like, the alkyl group(s) or the like may preferably be $R^1$ and/or $R^2$.

In the present embodiment, the aliphatic polycarbonate may have only one type of the constitutional unit or two or more types of the constituent units. In the case of two or more types, the combination and ratio may be appropriately selected in accordance with the purposes. For example, when the aliphatic polycarbonate has the constitutional unit (1a), the aliphatic polycarbonate may or may not have a constitutional unit other than the constitutional unit (1a). The aliphatic polycarbonate may have only one type of the constitutional unit (1a) or two or more types of the constitutional units (1a) and may also have only one constitutional unit other than the constitutional unit (1a) or two or more types thereof.

In the aliphatic polycarbonate of the present embodiment, the ratio of the amount (molar number) of the constitutional unit (1a) to the total amount (molar number) of the constitutional unit may preferably be 90 mol % or more, more preferably 95 mol % or more, further preferably 97 mol % or more, and particularly preferably 99 mol % or more, and may also be 100 mol %.

The aliphatic polycarbonate of the present embodiment may have an alkyl group or the like in its side chain, but from the viewpoint that the effect of facilitating the generation of carbon dioxide due to thermal decomposition is particularly remarkably obtained, the number of the alkyl groups or the like as the side chains may preferably be two or less, more preferably one or less, and particularly preferably zero (having no alkyl groups or the like as side chains). From the viewpoint of achieving a more reduced glass-transition temperature (Tg) and improved properties as a pressure sensitive adhesive component, such as improved adhesive strength and workability, the aliphatic polycarbonate may have any one or both of the alkyl group and the alkoxy group as a side chain or side chains.

The carbon number of the alkyl group and alkoxy group is as described above and may preferably be, for example, two or less and particularly preferably one.

For example, when the aliphatic polycarbonate of the present embodiment has the constitutional unit (1a), any one or more of $R^1$ to $R^4$ may be alkyl or alkoxy groups, but the number of the alkyl or alkoxy groups among $R^1$ to $R^4$ may preferably be two or less, further preferably one or less, and particularly preferably zero ($R^1$ to $R^4$ are all hydrogen atoms). When any one or more of $R^1$ to $R^4$ are the alkyl or alkoxy groups, the alkyl or alkoxy groups may preferably be those of which the carbon number is two or less, and the alkyl group(s) or alkoxygroup(s) of which the carbon number is two or less may preferably be $R^1$ and/or $R^2$ among $R^1$ to $R^4$.

(1-2) Physical Properties Etc. of Aliphatic Polycarbonate

The weight-average molecular weight (Mw) of the aliphatic polycarbonate used in the present embodiment may preferably be 10,000 or more, more preferably 30,000 or more, and particularly preferably 50,000 or more.

From another aspect, the weight-average molecular weight of the aliphatic polycarbonate may preferably be 1,000,000 or less, more preferably 500,000 or less, and particularly preferably 250,000 or less.

When the weight-average molecular weight of the aliphatic polycarbonate is not less than the above lower limit, the aliphatic polycarbonate can have more excellent pressure sensitive adhesive property. When the weight-average molecular weight is not more than the above upper limit, the viscosity of the solution is reduced to improve the coating properties.

Unless otherwise stated, the "weight-average molecular weight" as used in the present description refers to a polystyrene equivalent value that is measured using a gel permeation chromatography (GPC) method.

The dispersity index (Mw/Mn) of the aliphatic polycarbonate used in the present embodiment may preferably be 1.0 to 10.0, more preferably 1.0 to 8.5, and particularly preferably 1.0 to 7.0. Unless otherwise stated, the "dispersity index" as used in the present description refers to a value calculated using a weight-average molecular weight (Mw) and a number-average molecular weight (Mn) that are measured as polystyrene equivalent values by a gel permeation chromatography (GPC) method.

The glass-transition temperature (Tg) of the aliphatic polycarbonate used in the present embodiment may preferably be 150° C. or lower, more preferably 100° C. or lower, and particularly preferably 50° C. or lower. When the glass-transition temperature of the aliphatic polycarbonate is not higher than the above upper limit, the adhesive strength before applying energy for thermal decomposition is high.

From another aspect, the glass-transition temperature (Tg) of the aliphatic polycarbonate may preferably be −100° C. or higher, more preferably −85° C. or higher, and particularly preferably −70° C. or higher. When the glass-transition temperature of the aliphatic polycarbonate is not lower than the above lower limit, the pressure sensitive adhesive does not unduly soften under an ordinary temperature environment, so that the occurrence of troubles can be highly suppressed, such as a trouble that the pressure sensitive adhesive adheres to the punching blade when punching the pressure sensitive adhesive and a trouble that the label attached to an adherend via the pressure sensitive adhesive is displaced.

A method of measuring the glass-transition temperature may be as follows. That is, the method includes performing measurement with a temperature profile from −70° C. to 25° C. at a temperature increasing/decreasing rate of 10° C./min using DSC (PYRIS Diamond DSC) available from PerkinElmer, Inc. and confirming the inflection point to obtain the glass-transition temperature.

The pressure sensitive adhesive composition of the present embodiment may preferably contain 1 mass part or more, more preferably 5 mass parts or more, and further preferably 10 mass parts or more of the aliphatic polycarbonate with respect to 100 mass parts of the pressure sensitive adhesive resin which will be described later. From another aspect, the pressure sensitive adhesive composition of the present embodiment may preferably contain 100 mass parts or less, more preferably 85 mass parts or less, and further preferably 70 mass parts or less of the aliphatic polycarbonate with respect to 100 mass parts of the pressure sensitive adhesive resin.

When the content of the aliphatic polycarbonate is not less than the above lower limit, it is possible to more efficiently achieve the reduction in the adhesive strength of the pressure sensitive adhesive layer due to thermal decomposition of the aliphatic polycarbonate. Moreover, when the content of the aliphatic polycarbonate is not more than the above upper limit, contamination of an adherend by the pressure sensitive adhesive sheet can be suppressed.

(1-3) Method of Manufacturing Aliphatic Polycarbonate

The aliphatic polycarbonate used in the present embodiment can be manufactured, for example, through a production method including a step of polymerization reaction under the presence of a metal catalyst between carbon dioxide ($CO_2$) and a monomer that is polymerized so that the main chain is composed of aliphatic groups. If necessary, the water content may be controlled to a predetermined amount or less. As will be described below, the aliphatic polycarbonate having the constitutional unit (1a) can be manufactured, for example, through a production method that includes reacting carbon dioxide and a compound represented by General Formula (1b) below (ethylene oxide (epoxide) or its derivative, simply referred to as a "compound (1b)," hereinafter) to be polymerized under the presence of a metal catalyst and, if necessary, controlling the water content to a predetermined amount or less (see "WO2011/142259," for example). Unless otherwise stated, the "monomer" as used in the present description refers to a compound that undergoes a polymerization reaction with carbon dioxide so that the main chain is composed of one or more aliphatic groups. The "derivative" refers to a compound in which one or more hydrogen atoms of the original compound are substituted by one or more groups (substituents) other than hydrogen atoms. Examples of the "substituents" as used herein include the same substituents as those in the case in which the above-described $R^1$ to $R^4$ have substituents.

[Chemical Formula 4]

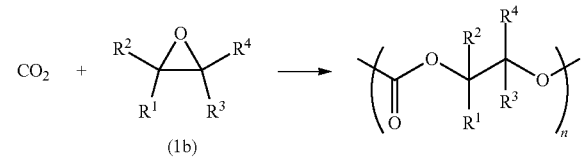

(1b)

(In the formula, $R^1$, $R^2$, $R^3$, and $R^4$ are the same as previously described, and n is an integer of 2 or more.)

In the formula, $R^1$ to $R^4$ are the same as $R^1$ to $R^4$ in the previously-described General Formula (1a).

In the formula, n is an integer of 2 or more and represents the number of the constitutional units (1a) in the above aliphatic polycarbonate.

Preferred examples of the compound (1b) include ethylene oxide, propylene oxide, 1-butene oxide, 2-butene oxide, isobutylene oxide, 1-pentene oxide, 2-pentene oxide, 1-hexene oxide, 1-octene oxide, 1-decene oxide, cyclopentene oxide, cyclohexene oxide, styrene oxide, vinylcyclohexene oxide, 3-phenylpropylene oxide, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, 3-methoxypropylene oxide (methyl glycidyl ether), 3-ethoxypropylene oxide (ethyl glycidyl ether), 3-n-propoxypropylene oxide (n-propyl glycidyl ether), 3-n-butoxypropylene oxide (n-butyl glycidyl ether), glycidyl acrylate, and glycidyl methacrylate.

Among these, ethylene oxide, a derivative of ethylene oxide, propylene oxide, and a derivative of propylene oxide may be more preferred as the compound (1b) because they have high polymerization reactivity with carbon dioxide.

Only one type or two or more types of monomers (e.g. the compound (1b) and other monomers than the compound (1b)) may be used in the step of polymerization reaction. In the case of two or more types, the combination and ratio may be appropriately adjusted in accordance with the purposes.

Examples of the metal catalyst used in the step of polymerization reaction include an aluminum catalyst and a zinc catalyst. Among these, a zinc catalyst may be preferred and an organozinc catalyst may be more preferred because they exhibit high polymerization activity in the polymerization reaction between carbon dioxide and the previously-described monomer.

Examples of the organozinc catalyst include organozinc compounds such as zinc acetate, diethyl zinc, and dibutyl zinc; and an organozinc catalyst obtained by a reaction between a zinc compound and a specific compound such as one or more types of compounds selected from the group consisting of primary amine, divalent phenol, divalent aromatic carboxylic acid, aromatic hydroxy acid, aliphatic dicarboxylic acid, and aliphatic monocarboxylic acid.

The zinc compound is not particularly limited, provided that it can be used to perform the above-described reaction. Examples of the zinc compound include inorganic zinc compounds such as zinc oxide, zinc hydroxide, zinc nitrate, and zinc carbonate; and organozinc compounds such as diethyl zinc, zinc acetate, and dibutyl zinc.

Among these, zinc oxide, zinc hydroxide, and diethyl zinc may be preferred as the zinc compound because they exhibit higher polymerization activity.

One type of the zinc compound may be used alone or two or more types may also be used in combination. When two or more types are used in combination, the combination and ratio may be appropriately adjusted in accordance with the purposes.

The organozinc catalyst may preferably be an organozinc catalyst obtained by reacting a zinc compound, aliphatic dicarboxylic acid, and aliphatic monocarboxylic acid because such an organozinc catalyst exhibits higher polymerization activity. For example, zinc glutarate is obtained by reacting zinc oxide and glutaric acid, but the organozinc catalyst is not limited to this.

The amount of metal catalyst to be used in the polymerization reaction may preferably be 0.001 mass parts or more and further preferably 0.01 mass parts or more with respect to 100 mass parts of the monomer to be used. From another aspect, the above amount of metal catalyst to be used may preferably be 20 mass parts or less and more preferably 14 mass parts or less with respect to 100 mass parts of the monomer to be used. When the amount of metal catalyst to be used is not less than the above lower limit, the polymerization reaction is more likely to progress. When the amount of metal catalyst to be used is not more than the above upper limit, excessive use of the metal catalyst is suppressed to improve the economic efficiency.

Methods of performing the polymerization reaction are not particularly limited, provided that the object product can be obtained. Examples of the methods include a method of charging the previously-described monomer and metal catalyst and a solvent as necessary into an autoclave, mixing them, and then injecting carbon dioxide into the obtained mixture for reaction.

The solvent to be used as necessary for the polymerization reaction is not particularly limited.

Examples of organic solvents as such solvents include aliphatic hydrocarbons such as pentane, hexane, octane, decane, and cyclohexane; aromatic hydrocarbons such as benzene, toluene, and xylene; halogenated hydrocarbons such as chloromethane, dichloromethane, chloroform, carbon tetrachloride, 1,1-dichloroethane, 1,2-dichloroethane, chloroethane, trichloroethane, 1-chloropropane, 2-chloropropane, 1-chlorobutane, 2-chlorobutane, 1-chloro-2-methylpropane, chlorobenzene, and bromobenzene; carboxylic esters such as ethyl acetate and propyl acetate; and carbonic esters such as dimethyl carbonate, diethyl carbonate, and propylene carbonate.

The amount of the solvent to be used may preferably be 100 to 10,000 mass parts with respect to 100 mass parts of the monomer to be used, from the viewpoint that the polymerization reaction is more likely to progress.

The pressure when injecting carbon dioxide in the polymerization reaction is not particularly limited, but may preferably be 0.1 to 20 MPa, more preferably 0.1 to 10 MPa, and further preferably 0.1 to 5 MPa. When the pressure at the time of injecting carbon dioxide is not lower than the above lower limit, the polymerization reaction is more likely to progress. When the pressure at the time of injecting carbon dioxide is not higher than the above upper limit, excessive use of carbon dioxide is suppressed to improve the economic efficiency.

During the polymerization reaction, the water amount in the reaction system may preferably be 5 mol % or less and more preferably 4.5 mol % or less with respect to the amount (mol) of the metal catalyst to be used. The water amount in the reaction system during the polymerization reaction can be measured, for example, using a Karl Fischer moisture meter. The water amount in the reaction system can be adjusted, for example, by a known method such as a method of using a desiccant.

The reaction temperature during the polymerization reaction is not particularly limited, but may preferably be 20° C. or higher and more preferably 40° C. or higher. From another aspect, the reaction temperature during the polymerization reaction may preferably be 100° C. or lower and more preferably 80° C. or lower. When the reaction temperature is not lower than the above lower limit, the polymerization reaction is completed in a shorter time. When the reaction temperature is not higher than the above upper limit, side reactions are suppressed and the yield of the aliphatic polycarbonate is improved.

The reaction time of the polymerization reaction may be appropriately adjusted depending on the reaction temperature, but may preferably be 2 to 40 hours.

After completion of the polymerization reaction, a known post-treatment operation may be performed as necessary and then the aliphatic polycarbonate as the object product can be taken out using a known method. The obtained aliphatic polycarbonate may be purified if necessary.

Carbon dioxide is a causative substance of global warming, while on the other hand, it is discharged in various industrial fields on a daily basis, and reduction in the amount of emission is required on the global scale. In this regard, the above-described production method allows carbon dioxide to be fixed because the method uses carbon dioxide as a raw material, and it can be said that the method is excellent also in expanding the choices of carbon resources.

Only one type of the aliphatic polycarbonate contained in the pressure sensitive adhesive composition of the present embodiment may be used or two or more types may also be used. In the case of two or more types, the combination and ratio may be appropriately selected in accordance with the purposes.

2. Acid/Base Generator
(1) Acid/Base Generator

The pressure sensitive adhesive composition of the present embodiment may preferably contain an acid/base generator that generates an acid or a base by applying energy. When the acid/base generator is further contained, the acid or base generated by applying energy promotes the thermal decomposition of the aliphatic polycarbonate, and the reduction in the adhesive strength can thus be more efficiently achieved.

Examples of the acid/base generator include a photo acid/base generator and a thermal acid/base generator, depending on the type of energy to be applied.

The photo acid/base generator refers to substances that generate an acid or abase when energy is applied by irradiation with active energy rays such as visible light rays, ultraviolet rays, and electron rays. Examples of a photo base generator that generates a base, among such photo acid/base generators, include α-aminoacetophenone compounds, oxime ester compounds, and compounds having substituents such as acyloxyimino groups, N-formylated aromatic amino groups, N-acylated aromatic amino groups, nitrobenzyl carbamate groups, and alkoxybenzyl carbamate groups. Preferred examples of the α-aminoacetophenone compounds include those having two or more nitrogen atoms in particular.

In the present embodiment, commercially-available products may also be used as the photo base generator. Examples of the commercially-available photo base generators include WPBG-018 (9-anthramethyl-N, N'-diethylcarbamate), WPBG-027 ((E)-1-[3-(2-hydroxyphenyl)-2-propenoyl]piperidine), WPBG-082 (guanidium-2-(3-benzoylphenyl)propionate), WPBG-140 (trade name: 1-(anthraquinone-2-yl) ethylimidazole carboxylate), WPBG-266 (1,2-diisopropyl-3-[bis(dimethylamino)methylene]guanidium-2-(3-benzoylphenyl)propionate), and WPBG-300 (1,2-dicyclohexyl-4,4,5,5-tetramethylbiguanidium-n-butyltri phenyl borate) (all are available from Wako Pure Chemical Industries, Ltd).

One type of the above photo base generator may be used alone or two or more types may also be used in combination.

Examples of a photo acid generator that generates an acid by irradiation with active energy rays include, but are not limited to, onium salts such as sulfonium salts, iodonium salts, diazonium salts, selenium salts, pyridinium salts, ferrocenium salts, phosphonium salts, and thiopyrylium salts. More preferred examples may be aromatic sulfonium salts and aromatic iodonium salts. Examples of the anion components include $BF_4^-$, $PF_6^-$, $AsF_6^-$, $SbF_6^-$, and $B(C_6F_5)_4^-$. Particularly preferred examples may be $PF_6^-$ and $B(C_6F_5)_4^-$.

Commercially-available products may also be used as the photo acid generator. Examples of aromatic sulfonium salts among the commercially-available photo acid generators include CYRACURE UVI-6992 and UVI-6974 (available from Dow Chemical Company), ADEKA OPTOMER SP-150, SP-152, SP-170, and SP-172 (available from ADEKA Corporation), and CPI-100P and CPI-101A (available from San-Apro Ltd). Examples of aromatic iodonium salts among the commercially-available photo acid generators include UV-9380C (available from Momentive Performance Materials Inc.), PHOTOINITIATOR 2074 (available from Rhodia Japan, Ltd.), WPI-116 and WPI-113 (available from Wako Pure Chemical Industries, Ltd.), and CI-5102 (available from Nippon Soda Co., Ltd).

One type of the above photo acid generator may be used alone or two or more types may also be used in combination.

The thermal acid/base generator refers to substances that generate an acid or a base when heat energy is applied. Examples of a thermal acid generator that generates an acid include, but are not limited to, pyridinium salt derivatives such as N-(4-methylbenzyl) 4'-pyridinium hexafluoroantimonate; hydrazinium salts; phosphonium salts; sulfonium salts such as dimethylphenylsulfonium hexafluorophosphate; phosphonic esters; sulfonic esters such as cyclohexyl (4-methylphenyl)sulfonate and isopropyl(4-methylphenyl) sulfonate; and vinyl ether adduct derivatives of carboxylic acids, such as propyl vinyl ether of 1,2,4-trimellitic acid. One type of them may be used alone or two or more types may also be used in combination.

Examples of a thermal base generator that generates abase when heat energy is applied include, but are not limited to, carbamate derivatives such as 1-methyl-1-(4-biphenylyl) ethylcarbamate, 1,1-dimethyl-2-cyanoethylcarbamate, N—(isopropoxycarbonyl)-2,6-dimethylpiperazine, N— (benzyloxycarbonyl)-2,6-dimethylpiperazine, and N-(2-nitrobenzyloxycarbonyl)cyclohexylamine; urea and urea derivatives such as N, N-dimethyl-N'-methylurea; guanidine derivatives such as guanidine trichloroacetate, methylguanidine trichloroacetate, guanidine phenylsulfonylacetate, guanidine p-methanesulfonylacetate, guanidine phenylpropiolate, guanidine p-phenylene-bis-phenylpropiolate, 1,2-ethane-bis (N,N'-diethylguanidium) 4-phenyl(sulfonylpheny lsulfonyl) acetic acid, (1,4-butane-bisguanidium) 4-phenyl (sulfonylphenylsulfonyl) acetic acid; dihydropyridine derivatives such as 1,4-dihydronicotinamide; quaternary ammonium salts such as quaternary ammonium salts of organosilane and/or organoborane, tetraammonium phenylsulfonylacetate, and tetraammonium phenylpropiolate; and dicyandiamide. One type of them may be used alone or two or more types may also be used in combination.

Among these, the photo base generator or thermal base generator may be preferred from the viewpoint of preventing corrosion of an adherend. They may preferably have cations comprising biguanide derivatives because decomposition of the aliphatic polycarbonate can be promoted even with a small amount of addition. Examples of those having cations comprising biguanide derivatives include WPBG-266 and WPBG-300 which are photo base generators.

The pressure sensitive adhesive composition of the present embodiment may preferably contain 0.5 mass parts or more, further preferably 1 mass part or more, and particularly preferably 2 mass parts or more of the acid/base generator with respect to 100 mass parts of the aliphatic polycarbonate. From another aspect, the pressure sensitive adhesive composition of the present embodiment may preferably contain 50 mass parts or less, further preferably 30 mass parts or less, and particularly preferably 20 mass parts or less of the acid/base generator with respect to 100 mass parts of the aliphatic polycarbonate.

When the content of the acid/base generator is not less than the above lower limit, thermal decomposition of the aliphatic polycarbonate can be promoted more efficiently. When the content of the acid/base generator is not more than the above upper limit, the amount of the acid/base generator which is a solid material can be suppressed to improve the coating properties during the formation of the coating film by applying the coating liquid.

(2) Means for Applying Energy

When the pressure sensitive adhesive composition of the present embodiment contains an acid/base generating group, energy may be applied in order to generate an acid or a base. Here, the means for applying energy may be irradiation with active energy rays or may also be heating.

When the means for applying energy is irradiation with active energy rays, examples of the active energy rays include ionizing radiation, that is, X rays, ultraviolet rays, electron rays, and the like. Among these, ultraviolet rays may be preferred because installation of irradiation facilities is relatively easy.

When ultraviolet rays are used as the ionizing radiation, near-ultraviolet rays including ultraviolet rays of wavelengths of about 200 to 380 nm may be used because of easy management. The amount of light may be appropriately selected in accordance with the type and amount of the photo acid/base generator (when the pressure sensitive adhesive resin to be described later is an active energy ray-curable pressure sensitive adhesive resin, the type and the like of an active energy ray-curable group of such a resin in addition to the above) as well as the thickness of the pressure sensitive adhesive layer. The amount of light may ordinarily be about 50 to 2,000 mJ/cm$^2$, preferably 100 to 1,700 mJ/cm$^2$, and more preferably 200 to 1,400 mJ/cm$^2$. The illuminance of ultraviolet rays may ordinarily be about 50 to 500 mW/cm$^2$, preferably 100 to 450 mW/cm$^2$, and more preferably 200 to 400 mW/cm$^2$. The ultraviolet ray source is not particularly limited, and examples thereof to be used include a high-pressure mercury lamp, metal halide lamp, and UV-LED.

When electron rays are used as the ionizing radiation, the accelerating voltage may be appropriately selected in accordance with the type and amount of the photo acid/base generator (when the pressure sensitive adhesive resin to be described later is an active energy ray-curable pressure sensitive adhesive resin (A), the type and the like of an active energy ray-curable group of such a resin in addition to the above) as well as the thickness of the pressure sensitive adhesive layer. The accelerating voltage may preferably be about 10 to 1,000 kV in general. The amount of irradiated rays may be set within a range in which the photo acid/base generator appropriately generates an acid or a base (when the pressure sensitive adhesive resin to be described later is an active energy ray-curable pressure sensitive adhesive resin (A), a range in which the resin (A) is appropriately cured), and may ordinarily be selected within a range of 10 to 1,000 krad. The electron ray source is not particularly limited, and examples thereof to be used include various electron ray accelerators, such as of Cockcroft-Walton type, Van de Graaff type, resonance transformer type, insulated core transformer type, linear type, dynamitron type, and high-frequency type.

When the above energy is heat energy, examples of the means for heating, heating conditions, and the like include those similar to the means and conditions for thermal decomposition of the aliphatic polycarbonate, which will be described later.

3. Pressure Sensitive Adhesive Resin

The pressure sensitive adhesive composition of the present embodiment contains, as an essential component, a pressure sensitive adhesive resin other than the aliphatic polycarbonate. This allows the adhesive strength of the pressure sensitive adhesive sheet to be readily set to a desired value.

The above pressure sensitive adhesive resin is not particularly limited, provided that it can impart desired adhesive strength and necessary removability to the pressure sensitive adhesive layer. As the polymer which constitutes the above pressure sensitive adhesive resin, for example, an acrylic-based polymer, rubber-based polymer, silicone-based polymer, urethane-based polymer, polyester-based polymer, polyvinyl ether-based polymer, or the like can be used. Among these, the acrylic-based polymer may be preferred because it can effectively suppress the dropping of an adherend.

The pressure sensitive adhesive resin may be a curable pressure sensitive adhesive resin or may also be a non-curable pressure sensitive adhesive resin, but when the pressure sensitive adhesive composition of the present embodiment contains an acid/base generator, the pressure sensitive adhesive resin may preferably be a curable pressure sensitive adhesive resin that is cured by the same energy as that applied for generating an acid or a base. Examples of such a curable pressure sensitive adhesive resin include an active energy ray-curable pressure sensitive adhesive resin and a thermoset pressure sensitive adhesive resin, depending on the type of energy for curing the pressure sensitive adhesive resin (or for generating an acid or a base from the acid/base generator).

When the above curable pressure sensitive adhesive resin is used, by applying energy to the pressure sensitive adhesive sheet, an acid or a base is generated from the acid/base generating agent to promote decomposition of the aliphatic polycarbonate and, in addition to this, the pressure sensitive adhesive resin can be cured to further reduce the adhesive strength. It is thus possible to further effectively exhibit the reduction in the adhesive strength due to thermal decomposition of the aliphatic polycarbonate, and the release of an adherend from the pressure sensitive adhesive sheet can be more readily performed.

(3-1) Active Energy Ray-Curable Pressure Sensitive Adhesive Resin

The primary material which constitutes the active energy ray-curable pressure sensitive adhesive resin (which may be referred to as an "active energy ray-curable pressure sensitive adhesive resin (A)," hereinafter) may be a polymer (A1) having an active energy ray-curable group in a side chain or may also be a combination of a polymer (A2) having no active energy ray curability and an active energy ray-curable compound (A3) other than the polymer (A1) having an active energy ray-curable group in a side chain. When the polymer (A1) having an active energy ray-curable group in a side chain is contained as the active energy ray-curable pressure sensitive adhesive resin, only the polymer (A1) having an active energy ray-curable group in a side chain may be contained, or the polymer (A1) and the polymer (A2) having no active energy ray curability and/or the active energy ray-curable compound (A3) may also be contained.

(3-1-1) Polymer (A1) Having Active Energy Ray-Curable Group in Side Chain

When the active energy ray-curable pressure sensitive adhesive resin (A) of the present embodiment contains the polymer (A1) having an active energy ray-curable group in a side chain, the polymer (A1) may be contained in the pressure sensitive adhesive layer without any modification or may also be contained as a crosslinked product obtained by a crosslinking reaction between at least a part of the polymer (A1) and a crosslinker.

Examples of the polymer (A1) having an active energy ray-curable group in a side chain include an acrylic-based polymer obtained by a reaction between a functional group-containing acrylic-based polymer (A1-1) and an active energy ray-curable group-containing compound (A1-2). The constitutional component of the functional group-containing acrylic-based polymer (A1-1) is a functional group-containing monomer that contains a functional group. The active energy ray-curable group-containing compound (A1-2) has an active energy ray-curable carbon-carbon double bond and a substituent that reacts with the above functional group.

The functional group-containing acrylic-based polymer (A1-1) may preferably be obtained by copolymerization of an acrylic-based monomer that contains a functional group and an acrylic-based monomer that does not contain a functional group and, if necessary, a monomer other than the acrylic-based monomers. That is, the above functional group-containing monomer may preferably be an acrylic-based monomer that contains a functional group.

The functional group of the acrylic-based monomer which contains the functional group (functional group of the functional group-containing monomer) may be selected so as to be capable of reacting with the substituent of the above active energy ray-curable group-containing compound (A1-2). Examples of such a functional group include a hydroxy group, carboxy group, amino group, substituted amino group, and epoxy group. Among these, the hydroxy group may be preferred from the viewpoint of preventing corrosion of an adherend such as a semiconductor wafer. To prevent corrosion of an adherend such as a semiconductor wafer, the functional group-containing monomer may preferably contain substantially no carboxy group. When the active energy ray-curable pressure sensitive adhesive resin (A) of the present embodiment contains a crosslinker, the functional group-containing acrylic-based polymer (A1-1) may preferably contain a functional group-containing monomer that reacts with the crosslinker, as a constitutional component. The functional group-containing monomer may also serve as a functional group-containing monomer having a functional group that is reactive with the substituent of the above curable group-containing compound.

Examples of the acrylic-based monomer which contains a hydroxy group (hydroxy group-containing monomer) include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. Among these, 2-hydroxyethyl (meth)acrylate may be preferred from the viewpoint of reactivity with the active energy ray-curable group-containing compound (A1-2). These may be used alone or two or more types may also be used in combination. The "(meth)acrylate" as used in the present description refers to both the acrylate and the methacrylate. The same applies to other similar terms.

The acrylic-based monomer which does not contain a functional group may preferably contain an alkyl (meth)acrylate monomer. Examples of the (meth)acrylate monomer include methyl (meth)acrylate, ethyl (meth)acrylate, propyl (meth)acrylate, n-butyl (meth)acrylate, n-pentyl (meth)acrylate, n-hexyl (meth)acrylate, 2-ethylhexyl (meth) acrylate, isooctyl (meth)acrylate, n-decyl (meth)acrylate, lauryl (meth)acrylate, myristyl (meth)acrylate, palmityl (meth)acrylate, and stearyl (meth)acrylate. Among the alkyl (meth)acrylate monomers, those of which the carbon number of the alkyl group is 1 to 18 may be preferred, and those of which the carbon number of the alkyl group is 1 to 4 may be particularly preferred. These may be used alone or two or more types may also be used in combination.

The acrylic-based monomer which does not contain a functional group may contain, in addition to the above alkyl (meth)acrylate monomer, for example, alkoxyalkyl group-containing (meth)acrylates such as methoxymethyl (meth) acrylate, methoxyethyl (meth)acrylate, ethoxymethyl (meth) acrylate and ethoxyethyl (meth)acrylate; (meth)acrylates having aromatic rings, such as phenyl (meth)acrylate; non-crosslinkable acrylamides such as acrylamide and methacrylamide; and (meth)acrylic esters having non-crosslinkable tertiary amino groups, such as N,N-dimethylaminoethyl (meth)acrylate and N,N-dimethylaminopropyl (meth)acrylate.

Examples of monomers other than acrylic-based monomers include olefins such as ethylene and norbornene, vinyl acetate, and styrene.

In the functional group-containing acrylic-based polymer (A1-1), the ratio of the mass of the constitutional portion originated from the functional group-containing monomer to the total mass of the functional group-containing acrylic-based polymer (A1-1) may preferably be 0.1 mass % or more, particularly preferably 1 mass % or more, and further preferably 3 mass % or more. From another aspect, the above ratio of the mass of the constitutional portion originated from the functional group-containing monomer may preferably be 50 mass % or less, particularly preferably 40 mass % or less, and further preferably 30 mass % or less. This makes it possible to adjust the amount of curable groups to be introduced due to the active energy ray-curable group-containing compound (A1-2) (and the amount of reaction with the crosslinker) to a desired amount so that the degree of curing (degree of crosslinking) of the obtained pressure sensitive adhesive layer can be controlled within a preferred range.

The functional group-containing acrylic-based polymer (A1-1) may be obtained by copolymerizing the above monomers using an ordinary method. The polymerization form of the functional group-containing acrylic-based polymer (A1-1) may be a random copolymer or may also be a block copolymer.

The active energy ray-curable group-containing compound (A1-2) has an active energy ray-curable carbon-carbon double bond and a substituent that reacts with the functional group of the functional group-containing acrylic-based polymer (A1-1). Examples of the substituent that reacts with the functional group of the functional group-containing acrylic-based polymer (A1-1) include an isocyanate group, epoxy group, and carboxy group, among which the isocyanate group may be preferred because of high reactivity with a hydroxy group.

The active energy ray-curable group-containing compound (A1-2) may preferably have 1 to 5 active energy ray-curable carbon-carbon double bonds in each molecule of the active energy ray-curable group-containing compound (A1-2).

Examples of such an active energy ray-curable group-containing compound (A1-2) include 2-methacryloyloxyethyl isocyanate; meta-isopropenyl-α,α-dimethylbenzyl isocyanate; methacryloyl isocyanate; allyl isocyanate; 1,1-(bisacryloyloxymethyl)ethyl isocyanate; an acryloyl monoisocyanate compound obtained by a reaction of a diisocyanate compound or a polyisocyanate compound and hydroxyethyl (meth)acrylate; and an acryloyl monoisocyanate compound obtained by a reaction of a diisocyanate compound or a polyisocyanate compound, a polyol compound, and hydroxyethyl (meth)acrylate. Among these, the 2-methacryloyloxyethyl isocyanate may be particularly preferred. One type of the active energy ray-curable group-containing compound (A1-2) may be used alone or two or more types may also be used in combination.

The weight-average molecular weight (Mw) of the polymer (A1) having an active energy ray-curable group in a side chain may preferably be 300,000 or more and more preferably 500,000 or more from the viewpoint of film formability during the coating and also from the viewpoint of reducing volatile components to reduce the pressure sensitive adhesive residue remaining on an adherend. From another aspect, the weight-average molecular weight of the above polymer (A1) may preferably be 2,000,000 or less and more preferably 1,000,000 or less.

(3-1-2) Polymer (A2) Having No Active Energy Ray Curability

When the active energy ray-curable pressure sensitive adhesive resin (A) of the present embodiment contains the polymer (A2) having no active energy ray curability, the polymer (A2) may be contained in the pressure sensitive adhesive layer without any modification or may also be contained as a crosslinked product obtained by a crosslinking reaction between at least apart of the polymer (A2) and a crosslinker. Examples of the polymer (A2) having no active energy ray curability include a phenoxy-based polymer, acrylic-based polymer, urethane-based polymer, polyester-based polymer, rubber-based polymer, and acrylic urethane-based polymer. Among these, the acrylic-based polymer may be preferred.

Acrylic-based polymers known in the art can be used as the polymer (A2) having no active energy ray curability. The acrylic-based polymer may be a homopolymer formed of one type of an acrylic-based monomer, a copolymer formed of plural types of acrylic-based monomers, or a copolymer formed of one or more types of acrylic-based monomers and a monomer other than the acrylic-based monomers. Specific types of compounds to be acrylic-based monomers are not particularly limited, and specific examples include (meth) acrylic acid, (meth)acrylic ester, and their derivatives (such as acrylonitrile and itaconic acid). Specific examples of the (meth)acrylic ester include (meth)acrylates having chain-like skeletons, such as methyl (meth)acrylate, ethyl (meth) acrylate, propyl (meth)acrylate, butyl (meth)acrylate, 2-ethylhexyl (meth)acrylate, and lauryl (meth)acrylate; (meth) acrylates having cyclic skeletons, such as cyclohexyl (meth) acrylate, benzyl (meth)acrylate, isobornyl (meth)acrylate, dicyclopentanyl (meth)acrylate, tetrahydrofurfuryl (meth) acrylate, and imido acrylate; (meth)acrylates having hydroxy groups, such as 2-hydroxyethyl (meth)acrylate, 2-hydroxypropyl (meth)acrylate, and 4-hydroxybutyl (meth) acrylate; (meth)acrylates having reactive functional groups other than hydroxy groups, such as glycidyl (meth)acrylate and N-methylaminoethyl (meth)acrylate. Examples of monomers other than the acrylic-based monomers include olefins such as ethylene and norbornene, vinyl acetate, and styrene. When the acrylic-based monomer is an alkyl (meth) acrylate, the carbon number of the alkyl group may preferably be 1 to 18.

When the pressure sensitive adhesive layer is formed using a crosslinker, the polymer (A2) having no active energy ray curability may preferably have a reactive functional group that reacts with the crosslinker. The type of the reactive functional group is not particularly limited and may be appropriately determined on the basis of the type of the crosslinker and the like.

For example, when the crosslinker is a polyisocyanate-based compound, examples of the reactive functional group of the polymer (A2) having no active energy ray curability include a hydroxy group, carboxy group, and amino group, among which the hydroxy group may be preferred because of high reactivity with the isocyanate group. When the crosslinker is an epoxy-based compound, examples of the reactive functional group of the polymer (A2) having no active energy ray curability include a carboxy group, amino group, and amide group, among which the carboxy group may be preferred because of high reactivity with the epoxy group. From the viewpoint of preventing corrosion of an adherend such as a semiconductor wafer, the reactive functional group may preferably be a hydroxy group.

Methods of introducing a reactive functional group into the polymer (A2) having no active energy ray curability are not particularly limited, and examples of the methods include a method of forming an acrylic-based polymer using a monomer having a reactive functional group so that the constitutional unit based on the monomer having the reactive functional group is contained in the skeleton of the polymer. For example, when a hydroxy group is introduced into the polymer (A2) having no active energy ray curability, the acrylic-based polymer may be formed using a monomer having a hydroxy group, such as 2-hydroxyethyl acrylate.

When the polymer (A2) having no active energy ray curability has a reactive functional group, the ratio of the mass of the constitutional portion originated from the monomer having the reactive functional group with respect to the total mass of the acrylic-based polymer may preferably be about 1 to 20 mass % and more preferably 2 to 10 mass % from the viewpoint of making the degree of crosslinking within a preferred range.

The weight-average molecular weight (Mw) of the polymer (A2) having no active energy ray curability may preferably be 300,000 to 2,000,000 and more preferably 400,000 to 1,500,000 from the viewpoint of film formability during the coating and also from the viewpoint of reducing volatile components to reduce the pressure sensitive adhesive residue remaining on an adherend.

(3-1-3) Active Energy Ray-Curable Compound (A3)

The active energy ray-curable pressure sensitive adhesive resin (A) may contain an active energy ray-curable compound (A3) other than the polymer (A1) having an active energy ray-curable group in a side chain. In this case, the active energy ray-curable pressure sensitive adhesive resin (A) may preferably contain the above-described polymer (A2) having no active energy ray curability together with the active energy ray-curable compound (A3). As substitute for or in addition to the polymer (A2) having no active energy ray curability, the polymer (A1) having an active energy ray-curable group in a side chain may be contained. The active energy ray-curable compound (A3) is a compound that has an active energy ray-curable group and is polymerized when irradiated with active energy rays.

The active energy ray-curable group of the active energy ray-curable compound (A3) may be, for example, a group that contains an active energy ray-curable carbon-carbon double bond, and specific examples include a (meth)acryloyl group and vinyl group.

Examples of the active energy ray-curable compound (A3) are not particularly limited, provided that they have the above-described active energy ray-curable groups, but from the viewpoint of versatility, the active energy ray-curable compound (A3) may preferably be a low-molecular-weight compound (monofunctional or polyfunctional monomer or oligomer). Specific examples of the low-molecular-weight active energy ray-curable compound (A3) include trimethylolpropane triacrylate, tetramethylolmethane tetraacrylate, pentaerythritol triacrylate, dipentaerythritol monohydroxy pentaacrylate, dipentaerythritol hexaacrylate, 1,4-butyleneglycol diacrylate or 1,6-hexanediol diacrylate, cyclic aliphatic skeleton-containing acrylates such as dicyclopentadiene dimethoxy diacrylate and isobornyl acrylate, and other acrylate-based compounds such as polyethylene glycol diacrylate, oligoester acrylate, urethane acrylate oligomer, epoxy modified acrylate, polyether acrylate, and itaconic acid oligomer.

Examples of the active energy ray-curable compound (A3) also include an epoxy resin having an active energy ray-curable group and a phenol resin having an active energy ray-curable group. Examples of such resins to be used include those as described in JP2013-194102A.

The molecular weight of the active energy ray-curable compound (A3) may ordinarily be 100 or more and preferably 300 or more. From another aspect, the molecular weight of the active energy ray-curable compound (A3) may ordinarily be 30,000 or less and preferably 10,000 or less.

(3-2) Thermoset Pressure Sensitive Adhesive Resin

Examples of the thermoset pressure sensitive adhesive resin include an epoxy resin and phenol resin.

(3-3) Non-Curable Pressure Sensitive Adhesive Resin

The non-curable pressure sensitive adhesive resin is not particularly limited. As a polymer that constitutes such a pressure sensitive adhesive resin, for example, the same polymers as those described in the previously-described polymer (A2) having no active energy ray curability can be used.

(3-4) Physical Properties Etc. of Pressure Sensitive Adhesive Resin

The weight-average molecular weight (Mw) of the polymer which constitutes the pressure sensitive adhesive resin may preferably be 300,000 or more and more preferably 500,000 or more from the viewpoint of film formability during the coating and also from the viewpoint of reducing volatile components to reduce the pressure sensitive adhesive residue remaining on an adherend. From another aspect, the weight-average molecular weight of the polymer which constitutes the pressure sensitive adhesive resin may preferably be 2,000,000 or less and more preferably 1,000,000 or less.

The glass-transition temperature (Tg) of the above polymer which constitutes the pressure sensitive adhesive resin may preferably be $-70°$ C. or higher, further preferably $-60°$ C. or higher, and particularly preferably $-50°$ C. or higher. From another aspect, the glass-transition temperature of the polymer which constitutes the pressure sensitive adhesive resin may preferably be $5°$ C. or lower, further preferably $-5°$ C. or lower, and particularly preferably $-15°$ C. or lower. When the glass-transition temperature is not lower than the above lower limit, oozing of the pressure sensitive adhesive from the end surface of an obtained pressure sensitive adhesive sheet can be suppressed. When the glass-transition temperature is not higher than the above upper limit, sufficient pressure sensitive adhesive property can be obtained.

4. Other Components in Pressure Sensitive Adhesive Layer (4-1) Crosslinker

The pressure sensitive adhesive layer of the present embodiment may be formed using a crosslinker that can react with the polymer which constitutes the previously-described pressure sensitive adhesive resin. In this case, a pressure sensitive adhesive composition that contains the above pressure sensitive adhesive resin and crosslinker can be prepared and used for formation of the pressure sensitive adhesive layer. The pressure sensitive adhesive layer formed using a crosslinker may contain a crosslinked product obtained by a crosslinking reaction between the crosslinker and the polymer which constitutes the previously-described pressure sensitive adhesive resin.

Examples of types of the crosslinker include polyisocyanate-based compounds, epoxy-based compounds, metal chelate-based compounds, polyimine compounds such as aziridine-based compounds, melamine resins, urea resins, dialdehydes, methylol polymers, metal alkoxides, and metal salts. Among these, the polyisocyanate-based compounds or epoxy-based compounds may be preferred because of easy control of the crosslinking reaction and the like.

The polyisocyanate-based compound is a compound having two or more isocyanate groups in a molecule. Specific examples of the polyisocyanate-based compound include aromatic polyisocyanates such as tolylene diisocyanate, diphenylmethane diisocyanate and xylylene diisocyanate, aliphatic polyisocyanates such as hexamethylene diisocyanate, alicyclic polyisocyanates such as isophorone diisocyanate and hydrogenated diphenylmethane diisocyanate, biuret products and isocyanurate products thereof, and adduct products that are reaction products with low molecular active hydrogen-containing compounds such as ethylene glycol, propylene glycol, neopentyl glycol, trimethylol propane, and castor oil.

Examples of the epoxy-based compound include 1,3-bis(N,N'-diglycidylaminomethyl)cyclohexane, N,N,N',N'-tetraglycidyl-m-xylylenediamine, ethylene glycol diglycidyl ether, 1,6-hexanediol diglycidyl ether, trimethylolpropane diglycidyl ether, diglycidylaniline, and diglycidylamine.

When the pressure sensitive adhesive layer is formed using a crosslinker, it may be preferred to form the pressure sensitive adhesive layer using 0.01 to 50 mass parts and particularly preferably 0.1 to 10 mass parts of the crosslinker with respect to 100 mass parts of the polymer which constitutes the previously-described pressure sensitive adhesive resin.

When the pressure sensitive adhesive layer of the present embodiment is formed using a crosslinker, it may be preferred to use an appropriate crosslinking promoter in accordance with the type of the crosslinker and the like. For example, when the crosslinker is a polyisocyanate-based compound, it may be preferred to use an organometallic compound-based crosslinking promoter such as an organotin compound.

(4-2) Sensitizer

When the pressure sensitive adhesive composition of the present embodiment contains a photo acid/base generator that generates an acid or a base by active energy rays such as ultraviolet rays, the pressure sensitive adhesive composition may further contain a sensitizer. When the pressure sensitive adhesive composition contains a sensitizer, the sensitivity of the photo acid/base generator is enhanced to increase the amount of the acid or base generated by irradiation with active energy rays.

The sensitizing mechanism of the sensitizer is not particularly limited and may be any of energy transfer, electron transfer, proton transfer, and the like. Examples of the sensitizer include thioxanthone-based sensitizers such as thioxanthone and 2-isopropylthioxanthone; benzophenone-based sensitizers such as benzophenone and p,p'-tetramethyldiaminobenzophenone; carbazole-based sensitizers; acetophene-based sensitizers; naphthalene-based sensitizers; phenol-based sensitizers; anthracene-based sensitizers such as 9-ethoxyanthracene; and other sensitizers such as biacetyl, eosin, rose bengal, pyrene, phenothiazine, and anthrone. One type of them can be used alone or two or more types can also be used in combination. Among these, the thioxanthone-based sensitizer may be preferred and the 2-isopropyl thioxanthone may be particularly preferred because the applicable wavelength region is suitable and the sensitivity is high.

When the pressure sensitive adhesive composition of the present embodiment contains a sensitizer, the content of the sensitizer may preferably be 0.01 mass parts or more, further preferably 0.05 mass parts or more, and particularly preferably 0.1 mass parts or more with respect to 100 mass parts of the photo acid/base generator. From another aspect, the content of the sensitizer may preferably be 20 mass parts or less, further preferably 10 mass parts or less, and particularly preferably 5 mass parts or less with respect to 100 mass parts of the photo acid/base generator. When the content of the sensitizer is not less than the above lower limit, the sensitivity to active energy rays can be sufficiently enhanced, while when the content of the sensitizer is not more than the above upper limit, the pressure sensitive adhesive sheet of the present embodiment can have excellent storage stability.

(4-3) Photopolymerization Initiator

When the pressure sensitive adhesive composition of the present embodiment contains the active energy ray-curable pressure sensitive adhesive resin (A) which is cured by active energy rays such as ultraviolet rays, the pressure sensitive adhesive composition may preferably contain a photopolymerization initiator.

Examples of the photopolymerization initiator include photo initiators, such as a benzoin compound, acetophenone compound, acyl phosphine oxide compound, titanocene compound, thioxanthone compound and peroxide compound, and photo sensitizers, such as amine and quinone. Specifically, there may be exemplified 1-hydroxycyclohexyl phenyl ketone, benzoin, benzoin methyl ether, benzoin ethyl ether, benzoin isopropyl ether, benzyl diphenyl sulfide, tetramethyl thiuram monosulfide, azobisisobutyronitrile, dibenzyl, diacetyl, β-chloroanthraquinone, 2,4,6-trimethyl benzoyl diphenyl phosphine oxide, and the like. When ultraviolet rays are used as the active energy rays, such a photopolymerization initiator may be compounded thereby to reduce the irradiation time and irradiation amount.

When the pressure sensitive adhesive composition of the present embodiment contains a photopolymerization initiator, the content of the photopolymerization initiator may preferably be 2 mass parts or more and particularly preferably 4 mass parts or more with respect to 100 mass parts of the previously-described active energy ray-curable pressure sensitive adhesive resin (A). From another aspect, the content of the photopolymerization initiator may preferably be 15 mass parts or less and particularly preferably 12 mass parts or less with respect to 100 mass parts of the active energy ray-curable pressure sensitive adhesive resin (A). When the content of the photopolymerization initiator is not less than the above lower limit, the photopolymerization reaction by the active energy rays can be sufficiently promoted, while when the content of the photopolymerization initiator is not more than the above upper limit, the pressure sensitive adhesive sheet of the present embodiment can have excellent storage stability.

(4-4) Other Components

The pressure sensitive adhesive composition for forming the pressure sensitive adhesive layer of the present embodiment may contain various additives such as a dye, pigment and other coloring materials, aflame retardant, filler, plasticizer, and antistatic in addition to the above components.

5. Pressure Sensitive Adhesive Sheet

The pressure sensitive adhesive sheet of the present embodiment comprises the pressure sensitive adhesive layer formed of the previously-described pressure sensitive adhesive composition. Unlike a composition that requires spin coating and the like, the pressure sensitive adhesive sheet of the present embodiment can be provided as a sheet and is therefore excellent in the handling property and easy to store. Moreover, in the case of the pressure sensitive adhesive sheet as in the present embodiment, the layer thickness accuracy of the pressure sensitive adhesive layer can be enhanced because the pressure sensitive adhesive layer may be preliminarily formed.

(5-1) Structure of Pressure Sensitive Adhesive Sheet

In the pressure sensitive adhesive sheet of the present embodiment, a release sheet may be laminated on each surface having pressure sensitive adhesive property for the purpose of protecting the previously-described pressure sensitive adhesive layer until the pressure sensitive adhesive layer is attached to an adherend. The pressure sensitive adhesive sheet of the present embodiment may or may not comprise a base material in addition to the above pressure sensitive adhesive layer. Examples of the case in which the pressure sensitive adhesive sheet does not comprise a base material include a case in which release sheets are laminated on both surfaces of the pressure sensitive adhesive layer.

The thickness of the pressure sensitive adhesive layer of the present embodiment may preferably be 1 μm or more, particularly preferably 5 μm or more, and further preferably 10 μm or more. From another aspect, the thickness of the pressure sensitive adhesive layer may preferably be 50 μm or less, particularly preferably 40 μm or less, and further preferably 30 μm or less. When the thickness of the pressure sensitive adhesive layer is not less than the lower limit, the pressure sensitive adhesive layer can have sufficient adhesive strength before heating (or before applying energy for curing in the case in which the pressure sensitive adhesive resin is a curable pressure sensitive adhesive resin) and can sufficiently fix an adherend. On the other hand, when the thickness of the pressure sensitive adhesive layer is not more than the upper limit, the pressure sensitive adhesive layer can have good releasability for an adherend after heating (or after applying energy for curing in the case in which the pressure sensitive adhesive resin is a curable pressure sensitive adhesive resin). Unlike the case in which a sheet is coated with a pressure sensitive adhesive as in spin coating and the like, the pressure sensitive adhesive sheet of the present embodiment is preliminarily formed with the above pressure sensitive adhesive layer, and the accuracy in the layer thickness can therefore be readily enhanced.

(5-2) Base Material

When the pressure sensitive adhesive sheet of the present embodiment comprises a base material, its constitutional material is not particularly limited, provided that the pressure sensitive adhesive sheet can appropriately function in a step of attaching the pressure sensitive adhesive sheet to an adherend, a step of working the adherend, a step of heating for thermal decomposition of the aliphatic polycarbonate, and other steps. The base material may ordinarily be composed of a film of which the primary material is a resin-based material.

Specific examples of such films include ethylene-based copolymer films such as an ethylene-vinyl acetate copolymer film, ethylene-(meth)acrylic acid copolymer film and ethylene (meth)acrylic ester copolymer film; polyolefin-based films such as a low-density polyethylene (LDPE) film, linear low-density polyethylene (LLDPE) film, high-density polyethylene (HDPE) film and other polyethylene films, a polypropylene film, polybutene film, polybutadiene film, polymethylpentene film, ethylene-norbornene copolymer film and norbornene resin film; polyvinyl chloride-based films such as a polyvinyl chloride film and vinyl chloride copolymer film; polyester-based films such as a polyethylene terephthalate film, polybutylene terephthalate film and polyethylene naphthalate film; polyurethane films; polyimide films; polyamide films; polystyrene films; polycarbonate films; and fluorine resin films. Their crosslinked films and modified films such as ionomer films may also be used. The above base material may be a film composed of one type of the above or may also be a laminated film comprising a combination of two or more types of the above.

The above base material may preferably have heat resistance. This allows the base material to appropriately exhibit its functions also in the heating step for thermal decomposition of the aliphatic polycarbonate. From such a viewpoint, among the previously-described films, the polyester-based films, polyamide films and polyimide films having sufficient heat resistance may be preferred, and the polyethylene terephthalate film may be particularly preferred.

The base material used in the present embodiment may contain various additives, such as a pigment, flame retardant, plasticizer, antistatic, glidant and filler, in the film of which the primary material is the above resin-based material. Examples of the pigment include titanium dioxide and carbon black. Examples of the filler include organic materials such as melamine resin, inorganic materials such as fumed silica, and metal-based materials such as nickel particles. The content of such additives is not particularly limited, but may have to be within a range in which the base material exhibits a desirable function and does not lose flatness and/or flexibility.

For the purpose of improving the interfacial adhesion of the above base material with a layer (such as a pressure sensitive adhesive layer) provided on the surface of the base material, one surface or both surfaces of the base material can be subjected to surface treatment, such as primer treatment for providing a primer layer and treatment using an oxidation method and/or roughening method, if desired. Examples of components that constitute the primer layer in the above primer treatment include polyester-based, polyurethane-based and polyacrylic-based synthetic resins, and these can be used alone or two or more types can also be used in combination. Examples of the oxidation method include corona discharge treatment, chromium oxidation treatment, flame treatment, hot-air treatment, ozone exposure treatment, and ultraviolet ray irradiation treatment. Examples of the roughening method include a sandblast method and solvent treatment method. These surface treatment methods may be appropriately selected in accordance with the type of the base material. As one example, a resin film, in particular a polyethylene terephthalate film, formed with a primer layer by the primer treatment may preferably be used.

The thickness of the base material is not limited, provided that the pressure sensitive adhesive sheet can appropriately function in a desired step. The lower limit of the thickness of the base material may preferably be 20 µm, more preferably 25 µm, and particular preferably 50 µm. From another aspect, the upper limit of the thickness of the base material may preferably be 450 µm, more preferably 400 µm, and particular preferably 350 µm.

(5-3) Release Sheet

When a release sheet is further laminated in the pressure sensitive adhesive sheet of the present embodiment, the structure of the release sheet is freely designed. Examples of the release sheet include paper base materials such as glassine paper, coated paper and wood-free paper, sheets of laminated paper obtained by laminating these paper base materials with resins such as polyethylene, films of polyester such as polyethylene terephthalate, polybutylene terephthalate and polyethylene naphthalate, films of polyolefin such as polypropylene and polyethylene, and other plastic films. Their release surfaces (surfaces to be in contact with the pressure sensitive adhesive layer) may preferably be subjected to release treatment. Examples of a release agent to be used in the release treatment include silicone-based, fluorine-based, and long-chain alkyl-based release agents.

When release sheets are laminated on both surfaces of the pressure sensitive adhesive layer, one of the release sheets may preferably be a tight release sheet that requires higher peeling force while the other may preferably be an easy release sheet that requires lower peeling force.

The thickness of the release sheet is not particularly limited, but may ordinarily be about 20 to 250 µm.

(5-4) Physical Properties of Pressure Sensitive Adhesive Sheet

The adhesive strength of the pressure sensitive adhesive sheet of the present embodiment before heating (or before applying energy for curing when the pressure sensitive adhesive resin is a curable pressure sensitive adhesive resin) may preferably be 1,000 mN/25 mm or more, further preferably 2,000 to 20,000 mN/25 mm, and particularly preferably 3,000 to 10,000 mN/25 mm. When the adhesive strength is 1,000 mN/25 mm or more, the adherend (such as a semiconductor wafer and ceramic green sheet laminate) can be sufficiently fixed in a working step for the adherend. For example, when a semiconductor wafer or a ceramic green sheet laminate undergoes a dicing step, troubles can be suppressed, including the chipping as well as the scattering of individual cut pieces such as semiconductor chips and laminated ceramic capacitors.

The adhesive strength of the pressure sensitive adhesive sheet of the present embodiment after heating (or after applying energy for curing when the pressure sensitive adhesive resin is a curable pressure sensitive adhesive resin) may preferably be 100 mN/25 mm or less, further preferably 0 to 70 mN/25 mm, and particularly preferably 5 to 40 mN/25 mm. When the adhesive strength is 100 mN/25 mm or less, the adhesive strength is sufficiently reduced after thermal decomposition of the aliphatic polycarbonate due to heating, and the adherend can be easily released.

As used herein, the adhesive strength refers basically to a peel strength that is measured using a method of 180° peeling in accordance with JIS 20237: 2000. Details of the method of measurement are described in the examples, which will be described later.

The pressure sensitive adhesive sheet of the present embodiment has the previously-described configuration and, in particular, the pressure sensitive adhesive composition contains the previously-described aliphatic polycarbonate. The adhesive strength before and after heating can therefore by easily controlled within the previously-described preferred ranges.

6. Method of Manufacturing Pressure Sensitive Adhesive Sheet

The pressure sensitive adhesive sheet of the present embodiment can be manufactured in the same manner as that for conventional pressure sensitive adhesive sheets. For example, details of the method of manufacturing the pressure sensitive adhesive sheet comprising the base material and the pressure sensitive adhesive layer are not particularly limited, provided that the pressure sensitive adhesive layer formed of the previously-described pressure sensitive adhesive composition can be laminated on one surface of the base material. An example of the method can include preparing a coating liquid that contains a pressure sensitive adhesive composition for constituting the pressure sensitive adhesive layer and, if desired, further contains a solvent or dispersion medium, coating a surface of the base material with the prepared coating liquid using an appropriate coater, such as a die coater, curtain coater, spray coater, slit coater, and knife coater, to form a coating film, and drying the coating film to form the pressure sensitive adhesive layer. Properties of the coating liquid are not particularly limited, provided that coating can be performed using the coating liquid. The components for forming the pressure sensitive adhesive layer may each be contained as a solute and/or a dispersant.

Another example of the method of manufacturing the pressure sensitive adhesive sheet may include coating the release surface of the previously-described release sheet with the coating liquid to form a coating film, drying the coating film to forma laminate of the pressure sensitive adhesive layer and the release sheet, and attaching the surface of the pressure sensitive adhesive layer of the laminate opposite to the release sheet side to a base material to obtain a laminate of the pressure sensitive adhesive sheet and the release sheet. The release sheet of the laminate may be removed as a process material and may also be used for protecting the pressure sensitive layer until the pressure sensitive adhesive sheet is attached to an adherend such as a semiconductor wafer and ceramic green sheet laminate.

When, among pressure sensitive adhesive sheets with no base materials, a pressure sensitive adhesive sheet is manufactured in which two release sheets are laminated on both surfaces of the pressure sensitive adhesive layer, the method can include coating the release surface of the previously-described release sheet with the coating liquid to form a coating film, drying the coating film to form a laminate of the pressure sensitive adhesive layer and the release sheet, and attaching the surface of the pressure sensitive adhesive layer of the laminate opposite to the release sheet side to the release surface of another release sheet to obtain a laminate of release sheet/pressure sensitive adhesive sheet/release sheet. The release sheets of the laminate may be removed as process materials and may also be used for protecting the pressure sensitive layer until the pressure sensitive adhesive sheet is attached to an adherend such as a semiconductor wafer and ceramic green sheet laminate.

When the coating liquid contains a crosslinker, the condition for the above drying (such as temperature and time) may be changed, or heating treatment may be separately provided, thereby to progress the crosslinking reaction between the crosslinker and the polymer, which constitutes the pressure sensitive adhesive resin, to form a crosslinked structure in the pressure sensitive adhesive layer with a desired existence density. To sufficiently progress the crosslinking reaction, aging may be performed such that, after the pressure sensitive adhesive layer is laminated on the base material using the above method or the like, the obtained pressure sensitive adhesive sheet is stationarily left for several days, for example, under an environment of 23° C. and a relative humidity of 50%.

7. Applications of Pressure Sensitive Adhesive Sheet

The pressure sensitive adhesive sheet of the present embodiment may be used, for example, when manufacturing electronic components. That is, the pressure sensitive adhesive sheet may be used for fixing an adherend in each step of manufacturing electronic components, performing various working steps, and then releasing and collecting the adherend(s) by heating. Examples of the adherend as used herein include a semiconductor wafer, a multilayer substrate, a ceramic green sheet laminate, and a packaged and sealed module.

In an example, when using the pressure sensitive adhesive sheet for a semiconductor wafer as the adherend, the semiconductor wafer may be attached to the surface at the pressure sensitive adhesive layer side. When a release sheet is laminated on the surface of the pressure sensitive adhesive sheet at the pressure sensitive adhesive layer side, the release sheet may be removed to expose the surface at the pressure sensitive adhesive layer side, and the surface may be attached to the adherend surface of the semiconductor wafer. When the working step for a semiconductor wafer is performed on a rigid support such as a glass support, the pressure sensitive adhesive sheet may be fixed onto the rigid support before or after the semiconductor wafer is attached.

Subsequently, the adherend (workpiece) as a working object may undergo various working steps. Examples of the working steps include a dicing step, backgrinding step, and fine working step. These steps may be performed on rigid supports. The pressure sensitive adhesive sheet of the present embodiment has sufficient adhesive strength before heating and, therefore, the adherend (workpiece) can be satisfactorily fixed during these working steps. For example, when a semiconductor wafer undergoes the dicing step, troubles can be suppressed, including the chipping as well as the scattering of obtained worked products (such as individual cut semiconductor chips).

When the pressure sensitive adhesive composition contains a photo acid/base generator, it is irradiated with active energy rays. This generates an acid or abase and allows the aliphatic polycarbonate to be readily decomposed by heat in the subsequent heating step. When the pressure sensitive adhesive composition contains an active energy ray-curable pressure sensitive adhesive resin, the pressure sensitive adhesive resin is cured to reduce the adhesive strength of the pressure sensitive adhesive layer, so that the adhesive strength is further reduced in the subsequent heating step thereby to allow the worked product or products to be more easily released. The irradiation conditions of active energy rays are as previously described. Such irradiation with active energy rays may preferably be performed before the heating step, which will be described later, because the volatilization of a photopolymerization initiator due to the heating step can be suppressed.

Thereafter, the heating step may be carried out to release the electronic component or components from the pressure sensitive adhesive sheet. This allows the aliphatic polycarbonate to be decomposed due to heat. When the pressure sensitive adhesive composition contains a thermal acid/base generator, such a heating step generates an acid or a base, and the aliphatic polycarbonate will be readily decomposed by heat. When the pressure sensitive adhesive composition contains a thermoset pressure sensitive adhesive resin, the pressure sensitive adhesive resin is cured to reduce the adhesive strength of the pressure sensitive adhesive layer, and the worked product or products can be easily released. It can thus be considered that thermal decomposition of the aliphatic polycarbonate causes irregularities on the pressure sensitive adhesive layer and expands the gap between the pressure sensitive adhesive layer and the adherend due to generation of carbon dioxide, so that the contact area with the adherend or adherends decreases to sufficiently reduce the adhesive strength. Moreover, in the pressure sensitive adhesive sheet of the present embodiment, the adhesive strength of the pressure sensitive adhesive layer can be reduced by a different mechanism than cohesive failure. After the release, therefore, contamination of the adherend or adherends due to the residue of the pressure sensitive adhesive can be suppressed.

Suitable means such as a hot plate, hot air dryer, and near-infrared lamp can be employed as means for heating. Heating conditions may be appropriately set in accordance with the heating temperature required for thermal decomposition of the aliphatic polycarbonate contained in the pressure sensitive adhesive layer, desired releasability, heat resistance of electronic components, base materials and the like, heating means, etc. When a hot plate is used, for example, exemplary general heating conditions include a temperature of 100° C. to 250° C. and a heating time of 5 to 90 seconds.

After the heating step, worked products (such as semiconductor chips) may be collected. Examples of the collecting method include a method of picking up them using a general purpose means such as a suction collet and a method of turning the pressure sensitive adhesive sheet upside down in a state in which the adherends are attached and collecting the worked products (adherends) which are released from the pressure sensitive adhesive sheet due to own weights of the worked products. In the pressure sensitive adhesive sheet of the present embodiment, the adhesive strength is sufficiently reduced due to heating and, therefore, even when pins, needles or the like are not utilized, such as when the working step for the adherend is carried out on a rigid support, the worked products can be picked up using a suction collet or the like, as previously described, or the worked products can be collected through turning the pressure sensitive adhesive sheet upside down and allowing the worked products to be released from the pressure sensitive adhesive sheet by the own weights. As will be understood, the collected worked products (such as semiconductor chips) may be delivered to the subsequent step such as a conveying step.

In the above pressure sensitive adhesive sheet of the present embodiment, the aliphatic polycarbonate undergoes thermal decomposition while generating carbon dioxide. When heat is applied at desired timing, therefore, the adhesive strength of the pressure sensitive adhesive layer can be reduced thereby to allow the adherend or adherends to be easily released from the pressure sensitive adhesive sheet.

The embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described in more detail by presenting Production Examples, Examples, Exemplary Tests, etc., but the present invention is not limited to the following Production Examples, Examples, Exemplary Tests, etc.

«Production Example 1» Preparation of Acrylic-Based Polymer (A1)

The functional group-containing acrylic-based polymer (A1-1) was obtained by copolymerizing n-butyl acrylate (BA), methyl methacrylate (MMA), and 2-hydroxyethyl acrylate (HEA) so that the molar ratio would be BA:MMA:HEA=60:30:10. The obtained acrylic-based polymer (A1-1) was reacted with 2-methacryloyloxyethyl isocyanate (MOI) (8 in terms of the above molar ratio) as the active energy ray-curable group-containing compound (A1-2) to obtain a polymer (A1) having an active energy ray-curable group in a side chain. The weight-average molecular weight and glass-transition temperature of the obtained acrylic-based polymer (A1) were measured: the weight-average molecular weight (Mw) was 730,000 and the glass-transition temperature (Tg) was −18° C.

«Production Example 2» Preparation of Aliphatic Polycarbonate

Inside of 1 L autoclave system equipped with a stirrer, gas inlet tube, and thermometer was preliminarily replaced with a nitrogen atmosphere and then charged with ethyl acetate, propylene oxide, and a toluene slurry liquid containing zinc glutarate as a metal catalyst. Then, carbon dioxide gas was added while stirring the obtained mixture, and the inside of the reaction system was charged with carbon dioxide gas until the pressure reached 1 MPa. Thereafter, the temperature was raised to 60° C. and the polymerization reaction was carried out while replenishing carbon dioxide gas consumed by the reaction. After completion of the reaction, the autoclave was cooled and depressurized, the content was diluted with ethyl acetate, and the insoluble catalyst was removed by filtration. The obtained ethyl acetate solution was dried to obtain an aliphatic polycarbonate, which was analyzed. The weight-average molecular weight was 65,000, the dispersity index was 4.66, and the glass-transition temperature was 8° C.

Example 1

The coating solution of a pressure sensitive adhesive composition was obtained through sufficiently stirring and mixing 100 mass parts (solid content equivalent, here and hereinafter) of the polymer (A1) having an active energy ray-curable group in a side chain obtained in Production Example 1, 57.4 mass parts of the aliphatic polycarbonate obtained in Production Example 2, 1.72 mass parts (3 mass parts with respect to 100 mass parts of the aliphatic polycarbonate) of a photo base generator (WPBG-300 available from Wako Pure Chemical Industries, Ltd.), 0.017 mass parts of 2-isopropylthioxanthone (available from Wako Pure Chemical Industries, Ltd.) as a sensitizer, 3 mass parts of a photopolymerization initiator (IRGACURE 184 available from BASF), and 0.5 mass parts of a tolylene diisocyanate adduct of trimethylolpropane (Coronate L available from Tosoh Corporation) as an isocyanate-based crosslinker with methyl ethyl ketone as a solvent. The release-treated surface of a release sheet (available from LINTEC Corporation, product name "SP-PET381031," thickness: 38 μm) obtained by release treatment of a polyethylene terephthalate film using a silicone-based release agent was coated with the obtained coating solution of the pressure sensitive adhesive composition using a knife coater, and the coating solution was then treated at 80° C. for 1 minute to form a pressure sensitive adhesive layer. The thickness after drying of the obtained pressure sensitive adhesive layer was 20 μm. Subsequently, the obtained pressure sensitive adhesive layer and a polyethylene terephthalate film (available from Toyobo Co., Ltd., product name "COSMOSHINE A4100", thickness: 50 μm) as a base material were attached to each other thereby to obtain a pressure sensitive adhesive sheet in a state in which the release sheet was laminated on the surface of the pressure sensitive adhesive layer opposite to the base material side.

Examples 2 to 16 and Comparative Examples 1 to 4

Pressure sensitive adhesive sheets were obtained in the same manner as in Example 1 except that the contents of the acrylic-based polymer (A1), photo base generator, sensitizer, and crosslinker were as listed in Table 1.

The glass-transition temperature (Tg) described in Production Examples, Examples, etc. was obtained through carrying out measurement with a temperature profile from −70° C. to 25° C. at a temperature increasing/decreasing rate of 10° C./min using DSC (PYRIS Diamond DSC) available from PerkinElmer, Inc. and confirming the inflection point to obtain the glass-transition temperature. The weight-average molecular weight (Mw) and dispersity index (Mw/Mn) described in Production Examples, Examples, etc. are values obtained from the polystyrene equivalent weight-average molecular weight and number-average molecular weight (Mn) measured under the following condition (GPC measurement) using a gel permeation chromatographic apparatus (available from Tosoh Corporation, product name "HLC-8020").

<GPC Measurement Condition>
Column: "TSK guard column HXL-L," "TSK gel G2500HXL," "TSK gel G2000HXL," and "TSK gel G1000HXL" (all available from Tosoh Corporation) connected in series
Column temperature: 40° C.
Developing solvent: tetrahydrofuran
Flow rate: 1.0 mL/min XG") and attached to the glass plate with a load by reciprocating a 5 kg roller once, and the test piece was left for 20 minutes. Thereafter, the pressure sensitive adhesive sheet was peeled off from the glass plate at a peeling speed of 300 mm/min and a peeling angle of 180°, and the adhesive strength (mN/25 mm) before heating was measured using a method of 180° peeling in accordance with JIS 20237: 2000. Results are listed in Table 1.

In addition, after the test piece was attached to a glass plate and left for 20 minutes in the same manner as the above, ultraviolet (UV) irradiation (illuminance: 254 mW/cm$^2$, light amount: 1,100 mJ/cm$^2$) was performed from the base material side of the pressure sensitive adhesive sheet using an ultraviolet irradiation apparatus (available from LINTEC Corporation, product name "RAD-2000") to cure the pressure sensitive adhesive layer. Thereafter, the test piece was stationarily placed on a hot plate heated to 130° C. so that the base material side of the test piece was in contact with the hot plate. Further, the adhesive strength (mN/25 mm) after heating was measured using a method of 180° peeling in the same manner as the above while heating the test piece. Results are listed in Table 1.

TABLE 1

| | Polymer (A1) [mass parts] | Aliphatic poly-carbonate [mass parts] | Photo-base-generating agent [mass parts] | Sensitizer [mass parts] | Crosslinker [mass parts] | Adhesive strength [mN/25 mm] Before UV irradiation/ heating | Adhesive strength [mN/25 mm] After UV irradiation/ heating |
|---|---|---|---|---|---|---|---|
| Example 1 | 100 | 57.4 | 1.72 | 0.017 | 0.5 | 5054 | 17.4 |
| Example 2 | 100 | 57.4 | 0 | 0 | 0.5 | 4950 | 68.9 |
| Example 3 | 100 | 57.4 | 1.72 | 0.017 | 1 | 4369 | 15.0 |
| Example 4 | 100 | 57.4 | 0 | 0 | 1 | 4606 | 50.8 |
| Example 5 | 100 | 57.4 | 1.72 | 0.017 | 3 | 3125 | 10.9 |
| Example 6 | 100 | 57.4 | 0 | 0 | 3 | 3497 | 36.2 |
| Example 7 | 100 | 10.3 | 0 | 0 | 1 | 7044 | 68.5 |
| Example 8 | 100 | 10.3 | 0.31 | 0.003 | 1 | 6996 | 20.4 |
| Example 9 | 100 | 10.3 | 0.51 | 0.005 | 1 | 5889 | 16.3 |
| Example 10 | 100 | 10.3 | 1.03 | 0.01 | 1 | 6028 | 15.0 |
| Example 11 | 100 | 57.4 | 2.87 | 0.029 | 1 | 3137 | 12.1 |
| Example 12 | 100 | 57.4 | 5.74 | 0.057 | 1 | 4317 | 7.0 |
| Example 13 | 100 | 90 | 0 | 0 | 1 | 3497 | 65.2 |
| Example 14 | 100 | 90 | 2.7 | 0.027 | 1 | 3125 | 15.7 |
| Example 15 | 100 | 90 | 4.5 | 0.045 | 1 | 2870 | 14.4 |
| Example 16 | 100 | 90 | 9.0 | 0.09 | 1 | 2700 | 14.1 |
| Comparative Example 1 | — | 57.4 | 0 | 0 | — | 82 | 0.0 |
| Comparative Example 2 | — | 57.4 | 0.57 | 0.006 | — | 93 | 0.0 |
| Comparative Example 3 | — | 57.4 | 1.72 | 0.017 | — | 79 | 0.0 |
| Comparative Example 4 | — | 57.4 | 2.87 | 0.029 | — | 98 | 0.0 |

Detector: differential refractometer
Standard sample: polystyrene
«Exemplary Test» Evaluation of Pressure Sensitive Adhesion The pressure sensitive adhesive sheet produced in each of Examples and Comparative Examples was cut into a size of 25 mm width×300 mm length to obtain a test piece for this exemplary test. The obtained test piece was left in an environment of 23° C. and 50% RH (relative humidity) for 24 hours, then the release sheet was removed, the pressure sensitive adhesive layer was overlapped on a glass plate (available from Corning Incorporated, product name "Eagle As found from Table 1, the pressure sensitive adhesive sheets obtained in Examples are those in which the adhesive strength is sufficiently reduced due to heating.

INDUSTRIAL APPLICABILITY

In the pressure sensitive adhesive sheet of the present invention, the adhesive strength can be reduced by applying heat at desired timing. The pressure sensitive adhesive sheet of the present invention is therefore particularly suitable for a pressure sensitive adhesive sheet used for temporality fixing a working object such as a semiconductor wafer and ceramic green sheet laminate in a production process for electronic components such as semiconductor chips and laminated ceramic capacitors.

The invention claimed is:

1. A pressure sensitive adhesive sheet comprising a pressure sensitive adhesive layer formed of a pressure sensitive adhesive composition,
the pressure sensitive adhesive composition comprising an aliphatic polycarbonate, a pressure sensitive adhesive resin other than the aliphatic polycarbonate, and an acid/base-generating agent that generates an acid or a base by applying energy to the pressure sensitive adhesive layer.

2. The pressure sensitive adhesive sheet as recited in claim 1, wherein the aliphatic polycarbonate does not have a carboxylic ester bond and a urethane bond in its main chain.

3. The pressure sensitive adhesive sheet as recited in claim 1, wherein the aliphatic polycarbonate has a weight-average molecular weight of 10,000 or more and 1,000,000 or less.

4. The pressure sensitive adhesive sheet as recited in claim 1, wherein the aliphatic polycarbonate has a glass-transition temperature of −100° C. or higher and 150° C. or lower.

5. The pressure sensitive adhesive sheet as recited in claim 1, wherein the aliphatic polycarbonate has a constitutional unit represented by General Formula (1a) as below:

[Chemical Formula 1]

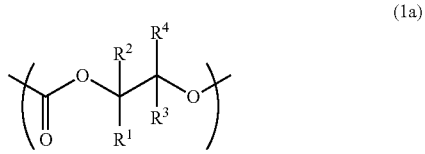

(1a)

where $R^1$, $R^2$, $R^3$, and $R^4$ each independently represent a hydrogen atom or an alkyl or alkoxy group that is unsubstituted or has a substituent, wherein when any two or more of $R^1$, $R^2$, $R^3$, and $R^4$ are alkyl or alkoxy groups that are unsubstituted or have substituents, the two or more alkyl or alkoxy groups may be bonded to each other to form a ring.

6. The pressure sensitive adhesive sheet as recited in claim 1, wherein the pressure sensitive adhesive composition contains 1 mass part or more and 100 mass parts or less of the aliphatic polycarbonate with respect to 100 mass parts of the pressure sensitive adhesive resin.

7. The pressure sensitive adhesive sheet as recited in claim 1, wherein a polymer that constitutes the pressure sensitive adhesive resin has a weight-average molecular weight of 300,000 or more and 2,000,000 or less.

8. The pressure sensitive adhesive sheet as recited in claim 1, wherein a polymer that constitutes the pressure sensitive adhesive resin has a glass-transition temperature of −70° C. or higher and 5° C. or lower.

9. The pressure sensitive adhesive sheet as recited in claim 1, wherein a polymer that constitutes the pressure sensitive adhesive resin is an acrylic-based polymer.

10. The pressure sensitive adhesive sheet as recited in claim 1, wherein the pressure sensitive adhesive resin is a curable pressure sensitive adhesive resin that is cured by applying the energy.

11. The pressure sensitive adhesive sheet as recited in claim 1, wherein means for applying the energy is irradiation with active energy rays.

12. The pressure sensitive adhesive sheet as recited in claim 11, wherein a polymer that constitutes the pressure sensitive adhesive resin is an acrylic-based polymer having an active energy ray-curable group in a side chain.

13. The pressure sensitive adhesive sheet as recited in claim 1, wherein the acid/base-generating agent has a cation comprising a biguanide derivative.

14. The pressure sensitive adhesive sheet as recited in claim 1, wherein the pressure sensitive adhesive composition contains 0.5 mass parts or more and 50 mass parts or less of the acid/base-generating agent with respect to 100 mass parts of the aliphatic polycarbonate.

15. The pressure sensitive adhesive sheet as recited in claim 1, comprising a base material.

16. The pressure sensitive adhesive sheet as recited in claim 15, wherein the base material has heat resistance.

17. The pressure sensitive adhesive sheet as recited in claim 1, wherein the applying energy to the pressure sensitive adhesive layer reduces adhesive strength of the pressure sensitive adhesive composition.

18. A pressure sensitive adhesive sheet comprising a pressure sensitive adhesive layer formed of a pressure sensitive adhesive composition,
the pressure sensitive adhesive composition comprising an aliphatic polycarbonate, a pressure sensitive adhesive resin other than the aliphatic polycarbonate, and an acid/base-generating agent that generates an acid or a base by applying thermal energy to the pressure sensitive adhesive layer.

19. The pressure sensitive adhesive sheet as recited in claim 18, wherein the applying energy to the pressure sensitive adhesive layer reduces adhesive strength of the pressure sensitive adhesive composition.

* * * * *